STORED LOGIC COMPUTER

Filed Jan. 8, 1962 10 Sheets-Sheet 1

EDWARD J. SCHNEBERGER
ALFRED D. SCARBROUGH
MILTON G. BIENHOFF
THOMAS A. CONNOLLY
INVENTORS

BY Samuel Lindsay [signature]
ATTORNEY

EDWARD J. SCHNEBERGER
ALFRED D. SCARBROUGH
MILTON G. BIENHOFF
THOMAS A. CONNOLLY
INVENTORS

BY [signature]
ATTORNEY

STORED LOGIC COMPUTER

Filed Jan. 8, 1962 10 Sheets-Sheet 3

EDWARD J. SCHNEBERGER
ALFRED D. SCARBROUGH
MILTON G. BIENHOFF
THOMAS A. CONNOLLY
INVENTORS

BY Samuel Lindenberg
ATTORNEY

EDWARD J. SCHNEBERGER
ALFRED D. SCARBROUGH
MILTON G. BIENHOFF
THOMAS A. CONNOLLY
INVENTORS

BY [signature]
ATTORNEY

EDWARD J. SCHNEBERGER
ALFRED D. SCARBROUGH
MILTON G. BIENHOFF
THOMAS A. CONNOLLY
INVENTORS

BY
Samuel Lindenberg
ATTORNEY

STORED LOGIC COMPUTER

Filed Jan. 8, 1962 10 Sheets-Sheet 6

EDWARD J. SCHNEBERGER
ALFRED D. SCARBROUGH
MILTON G. BIENHOFF
THOMAS A. CONNOLLY
INVENTORS

BY
Samuel Lindenberg
ATTORNEY

STORED LOGIC COMPUTER

Filed Jan. 8, 1962 10 Sheets-Sheet 7

EDWARD J. SCHNEBERGER
ALFRED D. SCARBROUGH
MILTON G. BIENHOFF
THOMAS A. CONNOLLY
INVENTORS

BY Samuel Lindenberg
ATTORNEY

EDWARD J. SCHNEBERGER
ALFRED D. SCARBROUGH
MILTON G. BIENHOFF
THOMAS A. CONNOLLY
INVENTORS

BY Samuel Lindenberg
ATTORNEY

June 28, 1966 E. J. SCHNEBERGER ET AL 3,258,748

STORED LOGIC COMPUTER

Filed Jan. 8, 1962 10 Sheets-Sheet 9

EDWARD J. SCHNEBERGER
ALFRED D. SCARBROUGH
MILTON G. BIENHOFF
THOMAS A. CONNOLLY
INVENTORS

BY
Samuel Lindenberg
ATTORNEY

EDWARD J. SCHNEBERGER
ALFRED D. SCARBROUGH
MILTON G. BIENHOFF
THOMAS A. CONNOLLY
INVENTORS

BY [signature]
ATTORNEY

1

3,258,748
STORED LOGIC COMPUTER
Edward J. Schneberger, Canoga Park, Alfred D. Scarbrough, Northridge, Milton G. Bienhoff, Canoga Park, and Thomas A. Connolly, Van Nuys, Calif., assignors to TRW Inc., a corporation of Ohio
Filed Jan. 8, 1962, Ser. No. 164,660
10 Claims. (Cl. 340—172.5)

This invention relates to information-handling machines and, more particularly, to improvements therein.

Conventional computers usually have complicated routines and/or subroutines wired into the machine which may be operated in response to instructions. The conventional computer instructions call for complex operations, which effectively are a sequence of simple operations. The sequence of operations is unique for each instruction and is called out by the instruction code. Such sequencing is made automatic to provide high-speed operation. Economy dictates that the number of such automatic sequences be limited and certain restrictions be put on the user. This limitation forces constraints on a programmer.

Many of these constraints can be removed if each of the detailed steps in the instruction sequence are separately programmed and new sequences to meet new requirements may be provided by programming. The important fact which makes such a machine possible is that any conceivable computer instruction can be synthesized by a sequence chosen from a suitable small set of minimal control functions. By using this concept, much of the wired control logic may be omitted. Instead, only single-function operation logic, which is termed microcommand logic, is wired into the hardware of the computer. The logic for any type of instruction above a micro-command level can then be stored in the computer's memory as a microprogram. Thus the computer becomes a stored logic computer. The key advantage of such a machine design is that it allows the logical organization (and therefore the operational instruction list) to be specified by predesigned portions of the program which is stored.

An object of this invention is the provision of a novel stored logic computer.

Another object of this invention is the provision of a novel arrangement in a stored logic computer for ordering out of the memory of said computer instructions and/or data for said computer.

Yet another object of the present invention is the provision of a novel arrangement for obtaining an address for the memory of a stored logic computer.

Still another object of the present invention is the provision of a simple system for deriving instructions and/or data from the random-access memory of a stored logic computer.

Yet another object of the present invention is the provision of a novel, useful, and simple computer system.

These and other objects of this invention may be achieved in an arrangement for a stored logic type of computer which has an adder and a number of registers with logic controlled means for transferring data between registers. The computer also has a random-access memory in which there are stored a plurality of instructions, as well as data, at a plurality of different addresses within said memory. Means are provided whereby an address of a first of these instructions is held in one register where it may be successively incremented to call forth in the proper sequence instructions for the computer. These instructions are read into a second register and then transferred to a third register where they are decoded for operating the remainder of the computer. An instruction can indicate whether further incrementing of an address for the next instruction should be performed or whether the instruction just completed should be repeated. Furthermore, means are provided whereby addresses which are located in other registers of the computer may be used for calling forth instructions from the memory in place of the incremented address and a return to the incremented address may then be made.

2

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

The stored logic concept specifies that the logic for any instructions above microcommand level is stored in the computer memory in the form of a microprogram, i.e., a sequence of microcommands. Each one of these microcommands will be henceforth designated as a logand. A group of these logands performs a basic operation. Such a group of logands will be henceforth referred to as a logram. A set of these lograms are employed to effectuate a particular task. Once a set of lograms has been designed, another programmer may use these lograms as the building blocks around which he can design his program. Thus, an effective instruction repertoire may be established. For example, a logram can be constructed for range, azimuth, and elevation-coordinate conversion to X, Y, and Z. Likewise, lograms to facilitate the scanning and acquisition modes can be generated. Thus each time a new program is required, the programmer need not develop this program by individual logands. He may take advantage of the sets of lograms previously developed for quickly accomplishing the required programming.

In a stored logic machine the logic instructions or logands required for accomplishing a particular task are entered into a memory, such as a random-access memory. It will be appreciated that a large number of these are involved. The problem then arises as to how to call the logands out of the memory in the proper sequence and timing in order that the machine may accomplish the particular data-processing desired. In accordance with this invention, no complicated routine need be gone through for properly specifying the addresses of the logands, as well as data within the memory. In accordance with this invention, a simple and novel arrangement is provided for operating the memory of a stored logic computer.

Figure 1:
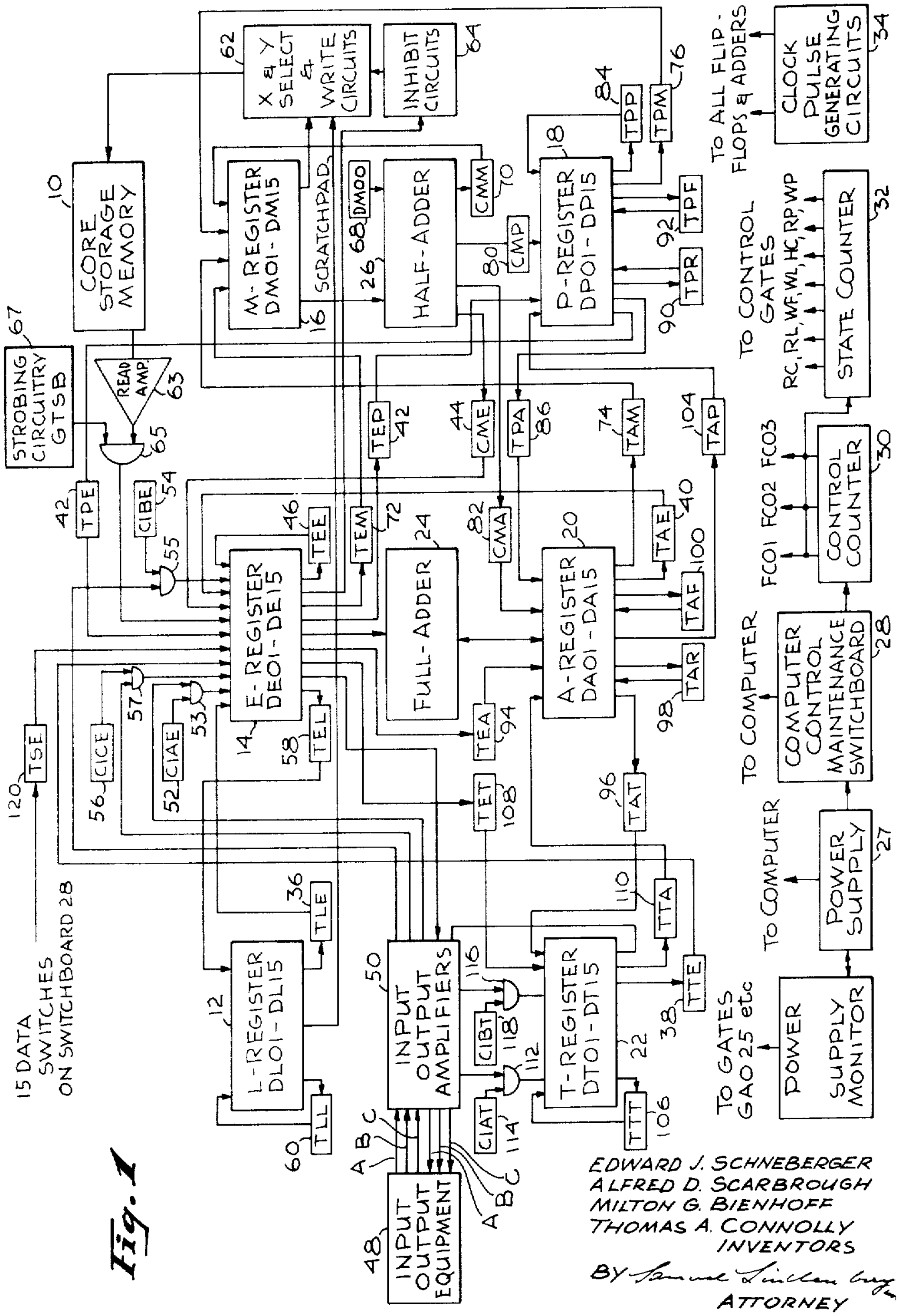
FIGURE 1 is a block diagram of a stored logic computer which exemplifies an embodiment of this invention.

Reference is now made to FIGURE 1, which is a block diagram of a stored logic computer in accordance with this invention. The machine contains a random-access memory 10, exemplified as a magnetic core storage memory. Into this memory there may be entered in advance of the machine functioning to process data, logic instructions or logands which are required to instruct the remainder of the machine how to process data which is entered therein. These logands may consist, by way of example, of 15 bits. Groups of these 15-bit logands for achieving a desired set of basic operations are designated as lograms.

In addition to the core memory, the stored logic machine includes six flip-flop registers, each capable of storing 15 bits, by way of example. These registers are designated as an L-register 12, an E-register 14, an M-register 16, a P-register 18, an A-register 20, and a T-register 22. In addition to the registers, the computer contains a 15-bit parallel full-addder 24 and a 15-bit parallel half-adder 26. In addition, the machine has a power supply 27 and a power supply monitor 29, a computer control and maintenance switchboard 28, a control counter 30, a state counter 32, clock-pulse generating circuits 34, and various control circuits for operation of the machine which will be discussed as this description progresses.

The E-register is used principally for holding information read from and/or written into the memory. The E-register also accepts the transfer of 15-bit operands from the L-register, the P-register, the A-register, the T-register, and the M-register via the half-adder 26. Transfers to the E-register from the various other registers are shown by the lines ending in arrows from the respective registers, which arrows terminate at the E-register. The logic and gating circuitry required for effectuating a transfer to the E-register is represented by rectangles in the path of these lines. Thus, the transfer of 15 bits of data from the L-register to the E-register is under control of TLE circuits 36. The transfer from the T-register to the E-register is under control of TTE circuits 38. The transfer from the A-register to the E-register is under control of TAE circuits 40. The transfer from the P-register to the E-register requires operation of circuits TPE 42. The transfer from the M-register via the half-adder 26 to the E-register requires the operation of CME circuits 44. In addition, the E-register circulates its contents via control and logic circuits TEE 46.

In addition, the E-register can receive data from input-output equipment 48 through any one of three cables ABC via input-output amplifiers 50. The selection of cable A is under control of CIAE logic circuits 52 and gates 53. The selection of cable B is under control of CIBE logic circuits 54 and gates 55. The selection of cable C is under control of CICE logic circuits 56 and gates 57. The E-register is the only register that receives information directly from the core memory and from which information can be written directly into the memory.

The L-register 12 is used to hold a logand while it is being interpreted by the logic circuits of the computer. The L-register receives its input from the E-register over gating and logic circuits TEL 58. The logand signals in the L-register are the logic signals which in conjunction with other sequencing signals, whose derivation is to be described, direct the operation of the computer. The low-order six bits of the L-register may be employed to address memory locations 0 through 63 of the magnetic-core memory. This portion of the magnetic-core memory is deignated as a scratch-pad memory. The scratch-pad section of the memory provides a temporary storage for intermediate results of computation, or logands. The L-register circulates its contents, using the TLL 60 gating and logic circuits. The L-register can address the core memory 10 through addressing and driving circuits, designated as X and Y select-and-write circuits 62. The data entered into the core storage memory 10 is that contained in the E-register 14. Thus, when the memory is addressed by the L-register for the purpose of writing, the data entered into the scratch-pad memory is that data which is in the E-register at the time.

The core storage memory 10 is of a type well known in the art, which consists of a plurality of core planes, in each of which core plane there are magnetic cores disposed in columns and rows. The columns and rows of cores are aligned so that a row coil is coupled to the same row of cores in each core plane. A column coil is coupled to the same column of cores in each core plane. The row and column coils are commonly referred to as X and Y coils. Selection of a correspondingly positioned core in each core plane for the purpose of being driven toward one of its two states of magnetic remanence is achieved by applying current to the X and Y coils coupled to these cores. There is a separate winding for each core plane which is coupled to every coil in the core plane. This is known as an inhibit winding. Those of the cores which it is desired to maintain in the state of remanence opposite to which they would be driven by the excitation of the X and Y cores may be so maintained by simultaneously applying an inhibit-current drive to the inhibit coil for that core plane. The E-register output is applied to inhibit circuits 64, which are operated in conjunction with the X and Y select-and-write circuits for entering or writing into the core storage memory the contents of the E-register in either a location in the scratch-pad memory, whose address is provided by the L-register, or in any location in the memory in an address which is provided by the M-register.

The output of the core storage memory, consisting of a bit of data obtained from each core which is interrogated, is applied to the reading amplifiers 63. The outputs of the reading amplifiers are entered into the E-register through gates 65 under control of strobing pulses provided by strobing circuitry 67. This insures that the output of the cores is read at a time when false reading signals are minimized.

The M-register 16 is used principally for addressing any one of the locations in the core memory. It operates in conjunction with the half-adder 26 to increment an address in the M-register, when so ordered, in order to provide the address of the next logand to be derived from the memory for execution. The M-register output is always applied to the half-adder 26. Whether or not the contents of the half-adder are incremented is determined by DMOO control logic circuits 68. The details of the operation of the DMOO logic circuits will be provided subsequently herein. The half-adder contents are returned to the M-register through logic and gating circuits, designated as TMM, 70. The M-register can also receive the contents of the E-register over the TEM logic and gating circuits 72. The M-register can receive the contents of the A-register over the TAM logic and gating circuits 74. The P-register may enter its contents into the M-register over the TPM logic and gating circuits 76.

It was pointed out that the M-register, by controlling the X and Y select-and-write circuits, can provide the address of any location in the core storage memory for the purpose of either reading or writing. By means of the transfer circuitry just described the contents of either the A-register, the P-register, or the E-register, may be substituted into the M-register in place of the contents of the M-register. Thus, the core memory may effectively be addressed by an address within the E, A, or P-registers, as well as an address in the M-register. Furthermore, by transferring the contents of the L or T-register through one of the other registers into the M-register, the memory can be addressed from any one of the registers of the computer.

If desired, the address in the M-register can be transferred to one of the other registers to be held there until the operations specified by the logand read from the substituted address have been carried out, at which time the M-register address can be transferred back.

There is no direct transfer out of data from the M-register. This always occurs thru the half-adder, i.e. from M-register to half-adder to other register. This facility is provided by the control-and-gating circuitry CME 44, whereby the output of the half-adder may be entered into the E-register. The output of the half-adder may be entered into the P-register thru control-and-gating circuitry CMP, 80. The M-register contents can be entered into the A-register via the half-adder by the control-and-gating circuitry CMA, 82.

Considering, next, the P-register, its contents are circulated by TPP control-and-gating circuitry 84. The contents of the P-register are transferred into the A-register over TPA control-and-gating circuitry 86. The contents of the P-register may be entered into the E-register over the TPE control-and-gating circuitry 40. When required, the contents of the P-register may be shifted right under control of the gating-and-control circuitry 90. The contents of the P-register may be shifted left under control of the gating-and-control circuitry TPF 92.

The contents of the A-register may be entered into the E-register via TAE gating-and-control circuitry 40. The contents of the A-register may be entered into the T-register via TAT control-and-gating circuitry 96. The contents of the A-register may be shifted right under TAR control-and-gating circuitry 98. The contents of the A-register may be shifted left under TAF control-and-gating circuitry 100. The A-register, which may also be designated as an arithmetic register, is used primarily to hold the results of arithmetic operations performed by the adder 24 and some logic operations. The A-register receives its principal inputs from the full adder 24. It may, however, receive its input from other registers, as indicated. The A-register may also transfer its contents into the P-register under control of the TAP control-and-logic circuits 104. The A-register and the P-register may be shifted left or right, either alone or while coupled together. Thus, the P-register may be used as an extension of the A-register for shift multiply-and-divide operations, when required.

The T-register is used principally for transferring data from the computer to the output devices. It may be used for transmission of output, while the rest of the computer proceeds independently. It may accept data from the E-register thru the TET control-and-logic circuits 108. It may accept data from the A-register thru the TAT control-and-logic circuits 96. Data from the T-register may be circulated thru the TTT control-and-logic circuits 106. Data from the T-register may be transferred to the E-register under control of TTE control-and-logic circuit 38. Data from the T-register may be transferred to the A-register under control of the TTA control-and-logic circuits 110. Input to the T-register from the input-output equipment occurs via the input-output amplifiers through gates 112, which also require control signals from CIAT control circuitry 114, or through gates 116, controlled by CIBT control circuitry 118. The gates 112 admit data from an A cable, and the gates 116 admit data from the B cable.

The L, E, M, P, A, and T registers each contains 15 flip-flop circuits, known as delay flip-flop circuits since the output in response to an input signal does not occur until the clock pulse succeeding the one assisting in driving the flip-flop. These flip-flop outputs are designated by the letter "D" followed by the letter designating the register, followed by a number indicating the position in the register followed by an "N" or a "C." N designates that the output is true or normal and C false or complement. Thus DL12N indicates that the twelfth flip-flop of the L-register has a true output. The registers, unless instructed otherwise by a logand, circulate their contents on every clock pulse. Each one of the "T" or "C" transfer logic circuits effectively constitutes 15 coincidence gates having the 15 "true sides" of the delay flip-flops as one input and a transfer signal as a second input. The transfer signal is usually provided by an amplifier, called a control amplifier, which is driven by the logical output of gates which decode the logand in the L-register. Clock signals time the entry of data into the registers.

The very first logand entry into the memory may be by setting switches which are furnished with the computer-control-and-maintenance switchboard 28. The setting of these switches is entered via the TSE gating and control circuits 120 into the E-register. This first instruction is then transferred into the L-register, which, may, in response thereto, control the entry of data into the core storage from the input-output equipment. The instructions or lograms entered into the core storage may thereafter be used for operating the computer.

The control counter 30 is a three flip-flop counter and therefore may be set in any one of eight different states. It is used for manual control of computer operation from the maintenance panel. The states of interest, in accordance with this invention is the ones which occur when the computer is running. When the three stages of the control counter are in their true states, their respective outputs may be designated as FCO1N, FCO2N and FCO3N. By actuating a switch on the switchboard 28 for operating the computer automatically, the control counter is operated to the state in which all three stages signify their "true" outputs.

Figure 2A:
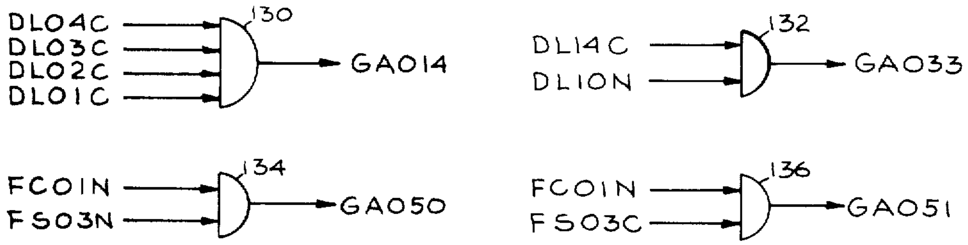
FIGS. 2A, 2B and 2C are logic block diagrams showing how input signals for the state counter shown in FIG. 2D used in this invention are derived.
Figure 2B:
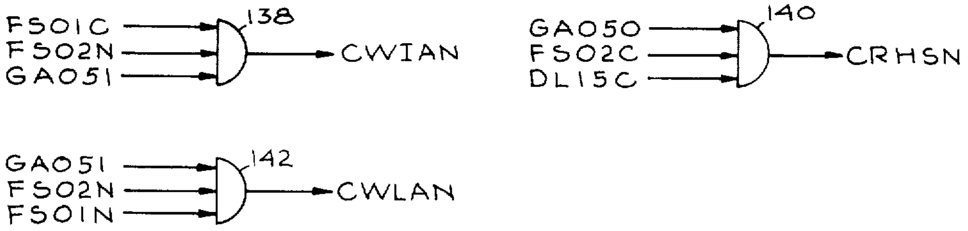
Figure 2C:
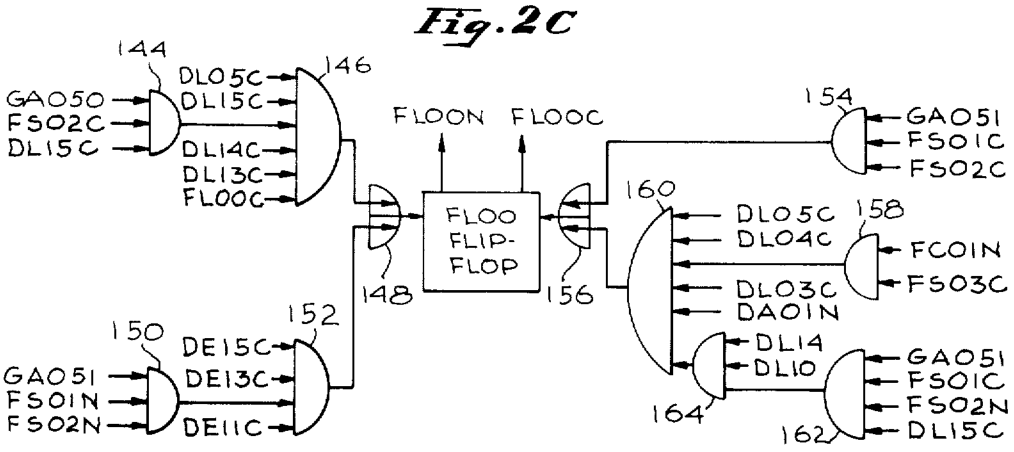
Figure 2D:
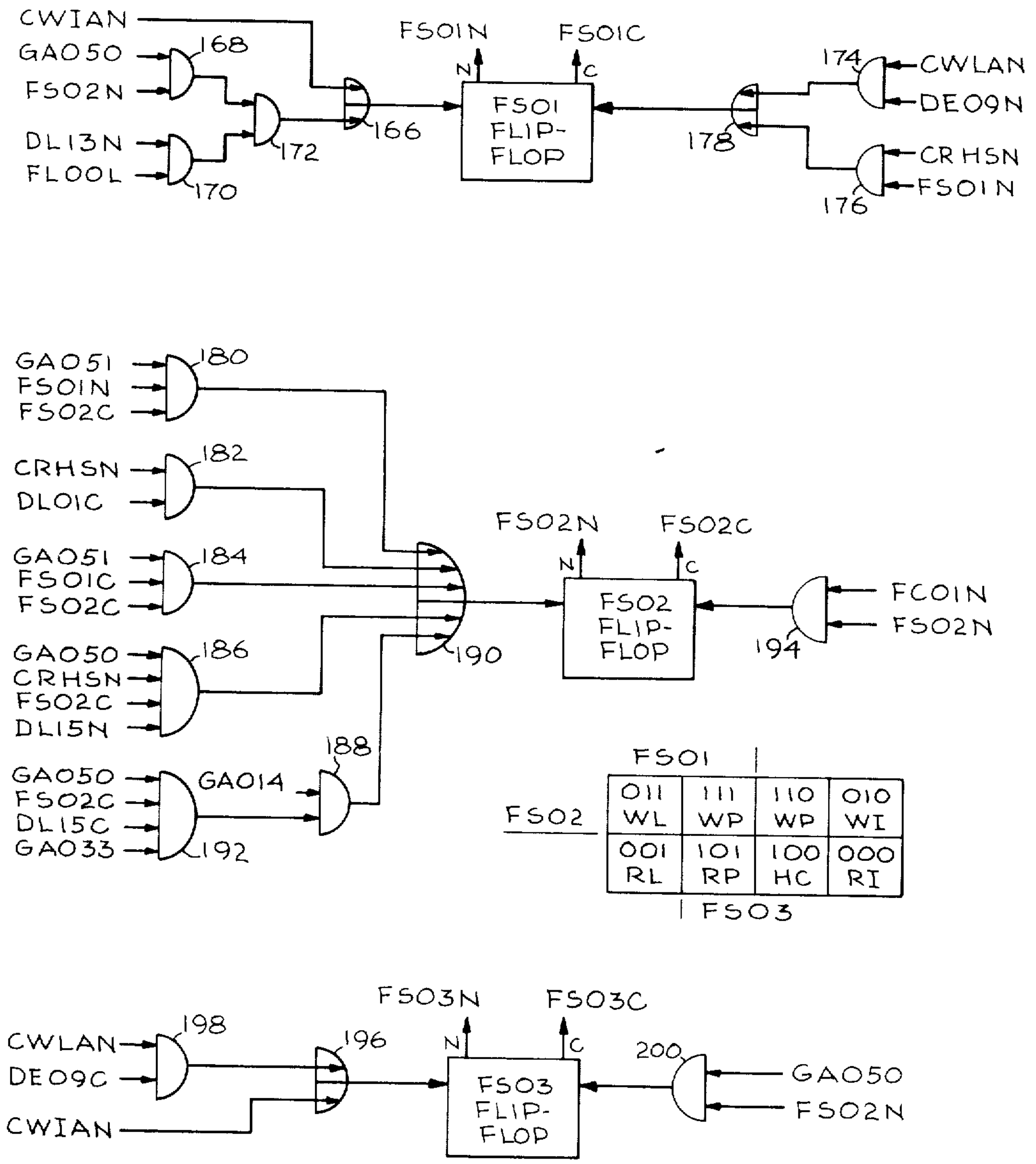
FIG. 2D is a logic block diagram of a state counter which is used in this invention.

State counter 32 consists of three flip-flop stages; seven distinct control states for the computer are defined by the outputs from this state counter. FIGURE 2D is a block diagram showing the three flip-flop stages, respectively FSO1, FSO2, and FSO3 for the state counter and the logic which sets these flip-flop circuits in its various states. FIGURES 2A, 2B, and 2C are logic diagrams which are used to define some of the input terms in the logic shown in FIGURE 2D. These diagrams illustrate how complex logic control signals are obtained from simple logic signals and are used to simplify the logic required to be shown in FIGURE 2D to actuate the flip-flop stages. Reference is now made to FIGURE 2A, wherein an AND gate 130 provides an output signal, which is designated by GAO14, when all of its inputs are simultaneously present. These inputs are the complement outputs of the first four flip-flop stages of the L-register. These are designated as DLO1C, DLO2C, DLO3C, and DLO4C. The letter "C" designates that the output is the complement, or false output. The letter "N" designates that the output is true, or the normal output.

An AND gate 132 provides an output signal which is designated by GAO33 when both of its inputs, respectively DL14C and DL10N, are present. These are taken from the fourteenth and tenth flip-flops, in the L-register. GAO14 and GAO33 exemplify logand decoding. An output signal, designated as GAO50, is derived from an AND gate 134 when its two inputs are simultaneously present. These two inputs are FCO1N and FCO3N. These are the respective true outputs derived from the first and third stages of the control counter. An output designated as GAO51 is derived from an AND gate 136 in the presence of its two inputs. These two inputs are respectively FCO1N and FSO3C. These are the true outputs of the first stage of the control counter and the complement output of the third stage of the state counter.

Referring now to FIGURE 2B, an AND gate 138 provides an output signal designated by CWIAN in the presence of the three inputs, respectively FSO1C, FSO2N, and GAO51. FSO1C is the complement output of the first stage of the state counter, and FSO2N is the true output of the second stage of the state counter. The GAO51 signal is derived from AND gate 136, shown in FIGURE 2A. An AND gate 140 supplies an output designated as CRHSN in the presence of the inputs GAO50, derived from AND gate 134 shown in FIGURE 2A, FSO2C, the complement output of the second stage of the state counter, and DL15C, which is the complement output of the fifteenth stage of the L-register. An AND gate 142 provides an output designated by CWLAN in the presence of inputs GAO51, FSO2N, and FSO1N.

In FIGURE 2C, the logic required to drive a flip-flop designated as FLOO to provide either an output FLOON or FLOOC is shown. An output is derived from an AND gate 144 in the simultaneous presence of inputs GAO50, FSO2C, and DL15C. The output of AND gate 144 is applied to an AND gate 146. The output of the AND gate 146 is applied to the flip-flop FLOO through an OR gate 148. AND gate 146 requires the simultaneous presence of the output of AND gate 144, as well as inputs DLO5C, DL15C, DL14C, and DL13C, and FLOOC, which is the complement output of the FLOO flip-flop.

An AND gate 150 can provide an output to a succeeding AND gate 152 in the simultaneous presence of inputs GAO51, FSO1N, and FSO2N. AND gate 152 can drive flip-flop FLOO through OR gate 148 to provide a normal output in the simultaneous presence of the output of AND gate 150, as well as complement outputs from E-register flip-flop stages DE11C, DE13C, and DE15C. FLOO flip-flop is driven to provide a complement output FLOOC in response to the output of an AND gate 154, which drives the flip-flop through an OR gate 156. The AND gate requires simultaneous inputs, GAO51, FSO1C, and FSO2C.

FLOO may also be driven to provide a complementary output by an alternative logic network. This includes the output of an AND gate 158 having as its input FCO1N and FSO3C. This AND gate output is applied to a following AND gate 160. An AND gate 162 provides an output in the presence of inputs GAO51, FSO1C, FSO2N, and DL15C. Its output drives a succeeding AND gate 164, which can provide an output to the AND gate 160 in the simultaneous presence of inputs DL14 and DL10. AND gate 160 can therefore drive the FLOO flip-flop to its complement output state in the simultaneous presence of the outputs of AND gates 158, 164, DLO5N, DLO4C, DLO3C, and DAO1N. These outputs are respectively derived from the L-register fifth stage, L-register fourth state, L-register third state, and A-register first stage.

Referring now to FIGURE 2D, the logic for driving the state counter flip-flops FSO1, FSO2, and FSO3 may now be understood. The flip-flop FSO1 is driven to provide FSO1N output in response to CWIAN signals (derived from AND gate 138), which are applied to the flip-flop through an OR gate 166. An AND gate 168 provides an output in response to the presence at its inputs of signals GAO50 and FSO2N. An AND gate 170 can provide an output in the presence of simultaneous inputs DL13N and FLOON. The AND gates 168 and 170 drive a succeeding AND gate 172, which can drive flip-flop FSO1 to provide an FSO1N output.

FSO1 flip-flop is driven to provide an FSO1C output by the signals derived from either an AND gate 174 or an AND gate 176, which are applied to the flip-flop through an OR gate 178. AND gate 174 can provide an output in response to a CWLAN input and a DEO9N input. AND gate 176 can provide an output in response to a CRHSN input and an FSO1N input.

The second stage of the state counter, namely, FSO2 flip-flop, can be driven to provide an FSO2N output in response to the output of an AND gate 180, or an AND gate 182, or an AND gate 184, or an AND gate 186, or an AND gate 188. These AND gates are all connected to an OR gate 190, the output of which drives the flip-flop to its normal or true state. AND gate 180 requires the simultaneous presence at its input of signals GAO51, FSO1N, and FSO2C. AND gate 182 requires the simultaneous presence at its input of signals CRHSN, DLO1C. AND gate 184 requires the simultaneous presence at its input of signals GAO51, FSO1C, and FSO2C. AND gate 186 requires the simultaneous presence at its input of signals GAO50, CRHSN, FSO2C, and DL15N. AND gate 188 provides an output in response to an input consisting of signals GAO14 and the output of an AND gate 192. The AND gate 192 provides an output when there are simultaneously present at its inputs the signals GAO50, FSO2C, DL15C, and GAO33.

The FSO2 flip-flop is driven to provide a complement output (FSO2C) by the output of an AND gate 194. This AND gate provides an output in the simultaneous presence of signals FCO1N, FSO2N.

The third stage of the state counter, flip-flop FSO3, is actuated to provide an FSO3N output in response to either at CWIAN signal, which is applied to it through an OR gate 196, or to the output of an AND gate 198. AND gate 198 provides an output in the simultaneous presence of signals CWLAN and DEO9C. The latter signal is the complement output of the ninth flip-flop in the E register. Flip-flop FSO3 is driven to its complement state in response to the output of an AND gate 198. This AND gate provides an output in the simultaneous presence of signals GAO5O and FSO2N.

Also shown on FIGURE 2D is a VEITCH diagram for the counter. The various count states of the counter are designated by binary numbers 000 through 111. Instead of referring hereafter to these counter states by their numerical count condition, they are referred to by letters which are associated with the number in the box. Thus, 000 presents the RI state, 001 the RL state, 010 the WI state, 011 the WL state, 100 the HC state, 101 the RP state, and 110 and 111 the WP state. When combined with GAO51 the WI signal becomes CWIAN. The WL signal becomes CWLAN.

To interpret the VEITCH diagram, regard the HC state (100), directly below the box in which the letters "HC" appear, are found FSO3. Above, to the left and to the right of the box in which "HC" appears, it will be seen that the letters FSO1 and FSO2 do not appear.

The states which the flip-flops assume in order to represent HC may be derived from the VEITCH diagram and also may be represented by a logical equation as follows:

$$HC=FSO3N\cdot FSO2C\cdot FSO1C$$

Taking another example, note RL on the diagram. Looking to the left, to the right and below the RL box, no state counter flip-flop designations are found. Looking above this box, FSO1 may be found. Thus, the states of the state counter stages may be represented by the logical equation $$RL=FSO1N\cdot FSO2C\cdot FSO3C$$

It is believed that with the foregoing examples, the use of the diagram to indicate the states of the counter may be easily deduced.

Figure 3:
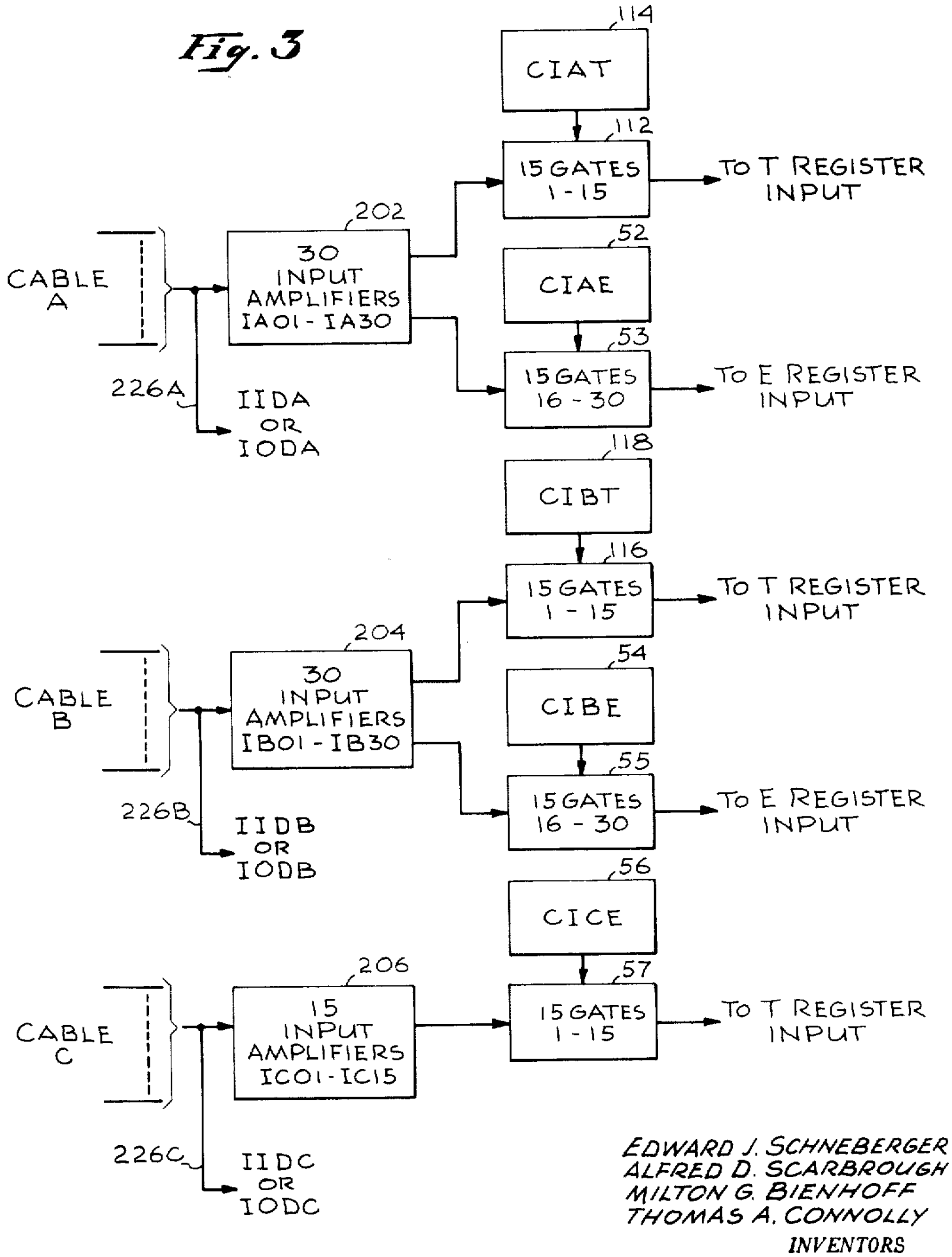
FIG. 3 is a block diagram of the computer input-output circuits.

FIGURE 3 is a more detailed block diagram of the input and output circuits of the computer than shown in FIG. 1. These circuits control and synchronize data flow between the computer and external devices. There are three cables, respectively cable A, cable B, and cable C, which connect input signals to the computer and remove output signals therefrom. Cable A can have 30 input wires and 30 output wires. Cable B can have 30 input wires and 30 output wires. Cable C can have 15 input wires and 15 output wires. The input wires of cable A are connected to 30 input amplifiers, represented by the rectangle 202. The cable B can have 30 input wires connected to 30 input amplifiers, represented by the rectangle 204. The 15 input wires of cable C are connected to 15 amplifiers represented by the rectangle 206.

Fifteen of the input amplifiers of cable A are connected to 15 coincidence gates, represented by the rectangle 112. Under the control of the CIAT logic 114, the 15 gates may be enabled to transfer their outputs into the T-register. The remaining 15 amplifier outputs carrying cable A signals are applied to the 15 coincidence gates 212. Under control of CIAE logic 52, these gates can transfer their outputs into the E-register.

The output of 15 of the 30 input amplifiers 204 of cable B are connected to 15 gates 116. Under control of the CIBT logic and circuits 118, these 15 gates can transfer their outputs into the T-register. Fifteen coincidence gates 55, when activated by CIBE logic 54, can transfer the signals on the remaining 15 input amplifiers of cable B into the E-register.

The 15 wires of cable C are amplified by the 15 input amplifiers and applied to 15 coincidence gates 57. When CICE logic circuits 56 activate these gates, their contents can be transferred into the T-register.

The structure of the logic circuits CIAT, CIAE, CIBT, CIBE, and CICE will be made clear subsequently herein. Computer control signals are generated in response to control signals received from external devices (not shown) which can direct the input-output circuit to connect the computer inut channel to one of the three input cables and to connect the computer output channel to one of the output cables. In this manner, the computer may be switched to an input-output device, which is thereby prepared to receive or transmit data. The transfer of data is always accomplished by word or block logands initiated by the control logic of the computer. Direction of transfer specified by the word or the block logand selects either the input or the output channel. As indicated above, cables A and B can input thirty bits into the T and E-registers, followed by a transfer for the T-register to the E-register. Output is from the T and E-registers after transfer from the E-register to the T-register. Cable C always inputs to the E-register and outputs from the T-register.

In addition to the data lines which comprise cable A, cable B, and cable C, each cable will also have at least one control line, respectively designated by 226A, 226B, and 226C, on which external signals can be applied. An external signal, on each line, for example respectively designated by IIDA, IIDB, or IIDC, indicates that a data word is available for input to the computer. Another external signal, respectively designated as IODA, IODB, IODC, indicates that a peripheral device is ready to accept a word of data.

Figure 4:
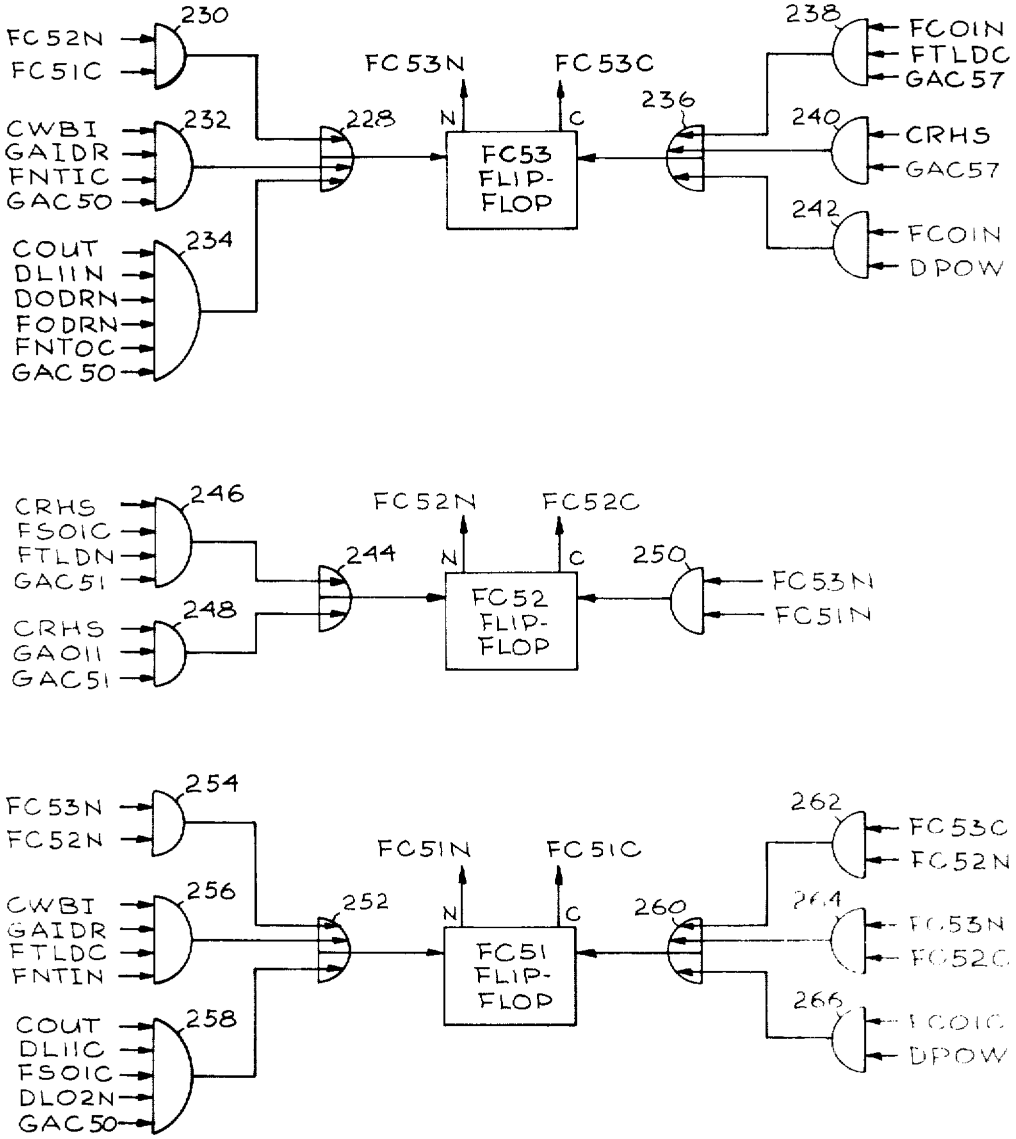
FIG. 4 is a block diagram of a timing control register used to time input and output data flow.
Figure 5:
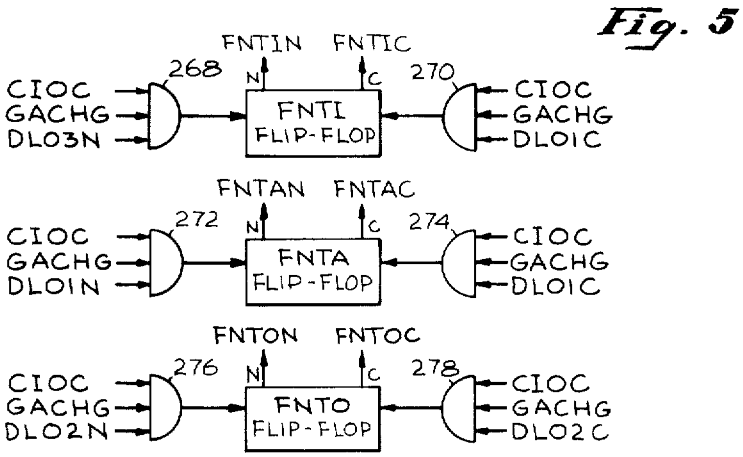
FIG. 5 is a block diagram of a register used to designate the proper input or output channel for the computer.

To control the various timing sequences necessary for data inputs and outputs, a three-bit register, called a timing register, is provided. This register is shown in FIGURE 4. The register is made up of three flip-flop circuits, respectively FC51, FC52, and FC53. Flip-flop 53 may be driven to the state wherein its normal output is activated by signals applied thereto through an OR gate 228. OR gate 228 is actuated by the output from either an AND gate 230, and AND gate 232, or an AND gate 234. AND gate 230 provides an output in the simultaneous presence of the complementary output of flip-flop FC51, and the normal output of flip-flop FC52. AND gate 232 provides an output in the simultaneous presence at its input of signals CWBI, GAIDR, GAC50, and FNTIC. The method of achieving these signals from basic logic signals is generally represented in FIGURES 2A, 2B, and 2C of the drawings. However, the specific combinations required for producing these signals is set forth in detail in a list of logical equations, which is shown subsequently herein. The FNTIC signal is the complement output of an FNTI flip-flop, which is shown in FIGURE 5.

AND gate 234 provides an output in the simultaneous presence of signals COUT, DL11N, DODRN, FODRN, FNTOC, and GAC50. The DL11N signal is the normal output of the eleventh flip-flop in the L-register. The FNTOC signal is derived from the complementary output of an FNTO flip-flop shown in FIGURE 5. The FODRN and DODRN signals are the normal signals obtained from the respective DODR and FODR flip-flops shown in FIGURE 7. The COUTC signal and GAC50 signal derivation will be shown subsequently in the list of logical equations to be provided herein.

FC53 flip-flop is driven to provide a complementary output by the output of an OR gate 236. OR gate 236 is driven by the output of either AND gate 238, AND gate 240, or AND gate 242. AND gate 238 is driven in the simultaneous presence of signals FCO1N, FTLDC, and GAC57. AND gate 240 is driven in the simultaneous presence of signals CRHS, and GAC57. AND gate 242 is driven in response to the simultaneous presence of signals FCO1N and DPOW. The source of the input signals to AND gates 238, 240, and 242, not yet shown, will be shown subsequently herein.

The FC52 flip-flop is driven to provide a normal output from the output of an OR gate 244. This OR gate may be driven in response to the output of either AND gate 246 or AND gate 248. AND gate 246 provides an output in the simultaneous presence at its input of signals CRHS, FSO1C, FTLDN, and GAC51. AND gate 248 provides an output in the simultaneous presence at its input of signals CRHS, GAO11, and GAC51.

The FC52 flip-flop is driven to provide a complement output signal by the output of an AND gate 250. This AND gate provides an output signal in the simultaneous presence of signals FC53N and FC51N.

FC51 flip-flop is driven to provide a normal output signal from the output of an OR gate 252. This OR gate is driven by the output of either AND gate 254, 256, or 258. AND gate 254 is driven in response to the simultaneous presence at its inputs of signals FC53N and FC52N. AND gate 256 is driven in response to the simultaneous presence at its input of signals CWBI, GAIDR, FTLDC, and FNTIN. AND gate 258 is driven in the simultaneous presence of signals COUT, DL11C, FSO1C, DLO2N, and GAC50.

Flip-flop FC51 is driven to provide a complement output by the output of an OR gate 260. The OR gate 260 is driven in response to the output of an AND gate 262 or an AND gate 264, or an AND gate 266. AND gate 262 is driven upon the application to its input simultaneously of the outputs of FC53C and FC52N. AND gate 264 is driven in response to the simutaneous application to its input of outputs FC53N and FC52C. AND gate 266 is driven in response to the simultaneous application to its inputs of signals FCO1C and DPOW.

The input and output cables which are selcted are determined by the output signals of three flip-flops, respectively FNTI, FNTA, and FNTO. The FNTI flip-flop is driven to provide a normal output in response to the output of an AND gate 268. This AND gate has its output energized in the simultaneous presence of signals CIOC, GACHG, and DLO3N. AND gate 270 is employed to drive the FNTI flip-flop to provide a complement output. AND gate 270 has its output energized upon the simultaneous presence at its input of the signals CIOC, GACHG, and DLO1C.

The FNTA flip-flop is driven to provide a normal output signal by the output of an AND gate 272. This AND gate is driven in response to the simultaneous presence of signals CIOC, GACHG, and DLO1N. Flip-flop FNTA is driven to provide a complement output by the output of an AND gate 274. This AND gate must simultaneously receive signals CIOC, GACHG, and DLO1C in order to drive the FNTA flip-flop. The FNTO flip-flop is driven to provide a normal output in response to output from an AND gate 276. This AND gate is driven in response to the simultaneous presence of signals CIOC, GACHG, and DLO2N. An AND gate 278 drives flip-flop FNTO to provide a complement output. This AND gate requires input signals CIOC, GACHG, and DLO2C.

The A cable input and output wires are used for FNTAN, FNTIN, FNTON signals. FUTAC, FNTIN and FNTON call for B cable input and B cable output. FNTAN, FNTIN and FNTOC call for A cable input and C cable output. FNTIN, FNTAC and FNTOC call for B cable input and C cable output. FNTAN, FNTON and FNTIC call for C cable input and A cable output. FNTAN, FNTIC and FNTOC call for C cable input and C cable output.

Figure 6:
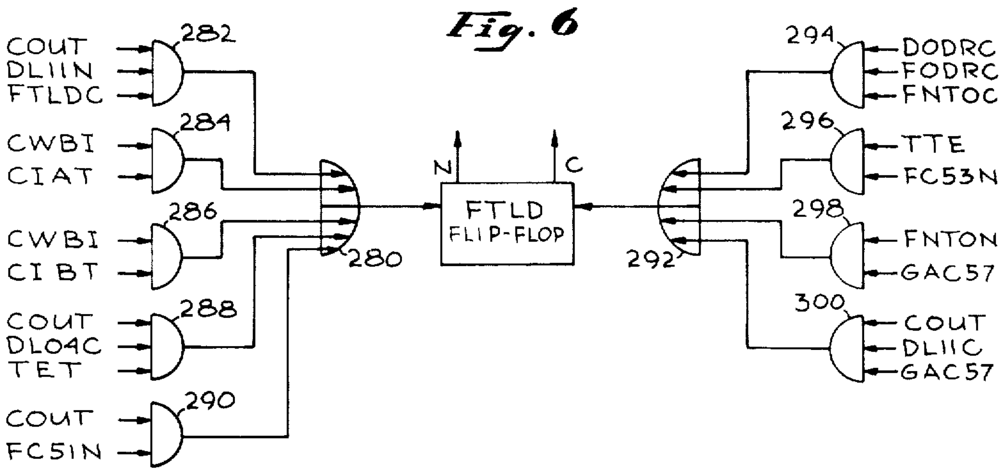
FIG. 6 is a block diagram of a flip-flop FTLD and its associated logic circuits. This flip-flop indicates the availability of the T-register.

FIGURE 6 is a block diagram of an FTLD flip-flop whose outputs are used to indicate to the channel-designation register and timing-control register when the T-register is in use. If the T-register is in use, it can be used for further input or output. The FTLD flip-flop is driven to provide an N-output by the output of an OR gate 280. This OR gate is driven by the outputs of any one of four AND gates, respectively 282, 284, 286, 288, and 290. AND gate 282 is driven upon the simultaneous application to its inputs of signals COUT, DL11N, and FTLDC. The AND gate 284 is driven in response to the application to its input simultaneously of signals CWBI and CIAT. AND gate 286 is driven in response to the application to its input of signals CWBI and CIBT. AND gate 288 provides an output in response to the simultaneous input of signals COUT, DLO4C, and TET. AND gate 290 provides an output in response to the application to its input simultaneously of signals COUT, and FC51N.

The flip-flop FTLD is driven to provide a complement output by the output from an OR gate 292. This OR gate is driven in response to an output from any one of AND gates 294, 296, 298, and 300. AND gate 296 requires at its input signals DODRC, FODRC, and FNTOC before is provides an output. AND gate 296 requires at its input simultaneously signals TTE and FC53N before it can provide an output. AND gate 298 has its output energized in the presence simultaneously of input signals FNTON and GAC57. AND gate 300 has its output energized in the simultaneous presence of signals COUT, DL11C, and GAC57. In the logical equations to be set forth subsequently herein, the derivation of all these signals applied to actuate the FTLD flip-flop, which are not yet shown, will be set forth. For example, the GAC57 signal is derived from the simultaneous presence of signals FC53C, FC52C, and FC51N. These signals are derived from the timing control register shown in FIGURE 4.

Figure 7:
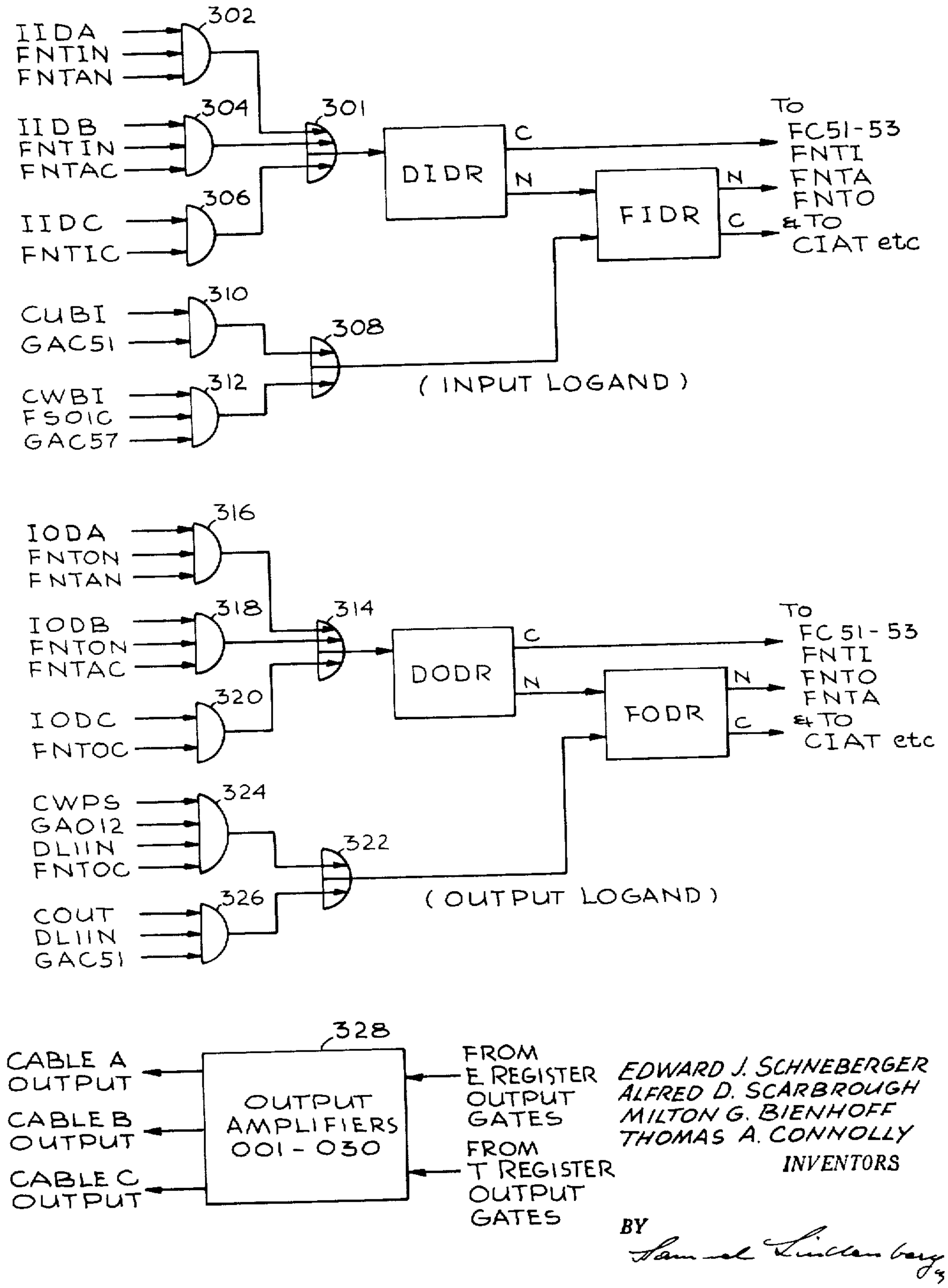
FIG. 7 is a block diagram of circuits used for control of the input of a word to the computer or the derivation of an output therefrom.

FIGURE 7 is a block diagram of other flip-flop circuits which are employed in controlling the input and output data requests. The outputs of the flip-flops DIDR and FIDR are applied to the timing-control register and channel-designation register shown in FIGURES 4 and 5, in response to input and output data-request signals. Flip-flop DIDR is driven to provide a normal output by the output of an OR gate 301. This OR gate is driven in response to the output of either AND gate 302, 304, or 306. The AND gate 302 requires as input signals a data signal IIDA, received from line 226A, and FNTIN and FNTAN signals. These are the normal outputs of flip-flops FNTI and FNTA, shown in FIGURE 5.

AND gate 304 requires a simultaneous application of input signals IIDB, FNTIN, and FNTAC, to provide an output. AND gate 306 requires simultaneous input of signals IIDC and FNTIC. Flip-flop DIDR returns to the state at which it provides a complement output in the absence of any input signals. The normal output of flip-flop DIDR drives flip-flop FIDR to provide a normal output. The complement output of flip-flop FIDR is obtained in response to an "input" logand being applied to its reset input. This input logand consists of signals CWBI and GAC5, which are applied to an AND gate 310. The output of AND gate 310 can drive an OR gate 308, which in turn can drive the FIDR flip-flop to provide a complement output. Another AND gate 312 can also drive OR gate 308 in response to the application to its input of signals CWBI, FSOIC, and GAC57. The DODR flip-flop is driven to provide a normal output by an OR gate 314. The OR gate 314 is driven in response to outputs from any one of AND gates 316, 318, or 320. AND gate 316 provides an output in the simultaneous presence of inputs IODA, FNTON, and FNTAN. AND gate 318 provides an output in the presence of simultaneous inputs IODB, FNTON, and FNTAC. AND gate 320 provides an output in the simultaneous presence of inputs IODC and FNTOC.

DODR flip-flop returns to its complement state when no signals are applied from the OR gate 314. The normal output of flip-flop DODR drives flip-flop FODR to provide a normal output. Flip-flop FODR is driven to provide a complement output when an output logand is applied to its input through an OR gate 322. OR gate 322 is driven by either an AND gate 324 or an AND gate 326. The AND gate 324 can be driven in response to the application to its input of signals CWPS, GAO12, DL11N, and FNTOC. AND gate 326 can be driven by the application to its input of signals COUT, DL11N, and GAC51.

The DIDR, FIDR, DODR and FODR flip-flops provide output signals to the channel designation and timing control registers as well as to the control logic CIAT, CIAE, CIBT, CIBE, and CICE.

For handling the output signals from the E and T-registers 30 output amplifiers 328 are provided. Fifteen of of these receive output from the E-register output gates, and the remaining 15 receive output from the T-register output gates. The 30 output amplifiers are connected to the 30 output lines of both cable A and cable B. The 15 output amplifiers allocated to the T-register are also connected to the 15 output lines of cable C.

Figure 8:
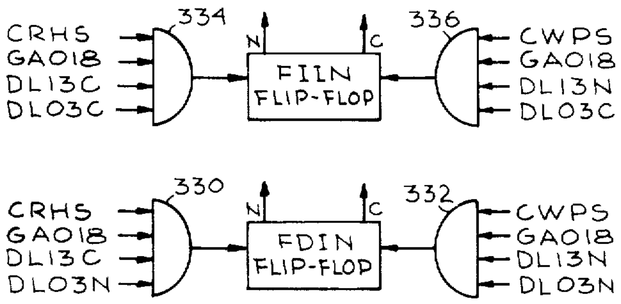
FIG. 8 is a block diagram of flip-flops and logic required for interrupt routines.

Two more flip-flops are employed in the input-output control portion of the computer. These are shown in FIGURE 8 and are, respectively, flip-flops FIIN and FDIN. Flip-flop FDIN provides a normal input when it has been signaled that there is an interrupt routine to be performed by a signal over a line associated with one of the input cables. The FDIN flip-flop provides its normal output until the interrupt routine is completed and prevents further recognition of any data interrupts during this interval. The FIIN flip-flop prevents interruption of the interrupt routine. The FDIN flip-flop provides a normal output in response to an input from an AND gate 330. This AND gate requires input signals CRHS, GAO18, DL13C, and DLO3N before it provides an output. The FDIN flip-flop is driven to provide a complement output in response to the output from an AND gate 332. This AND gate is driven in response to signals CWPS, GAO18, GL13N, and DLO3N.

Flip-flop FIIN is driven to provide a normal output in response to the output of an AND gate 334; this AND gate provides an output in response to input signals CRHS, GAO18, DL13C, and DLO3C. Flip-flop FIIN is driven to provide a complement output in response to the output of AND gate 336; this AND gate provides an output in response to signals CWPS, GAO18, DL13N, and DLO3C.

Summarizing briefly, operation of the input-output circuits serves to control and synchronize data flow between computer and external devices. Control signals from the external devices together with computer control signals direct the selection of which of three input cables are selected for data input and which of three output cables are selected for data output. Input data requests are applied to flip-flops FIDR and DIDR and are thence communicated to the timing counter FC51–FC53 and flip-flops FNTA, FNTI and FNTO together with logand signals from the computer to open the gates which select the cables. Output data requests are applied to flip-flops FODR and DODR and are thence communicated to the timing counter FC51–FC53 and flip-flops FNTA, FNTI and FNTO together with logand signals from the computer to open the gates which select the cables.

Figure 9:
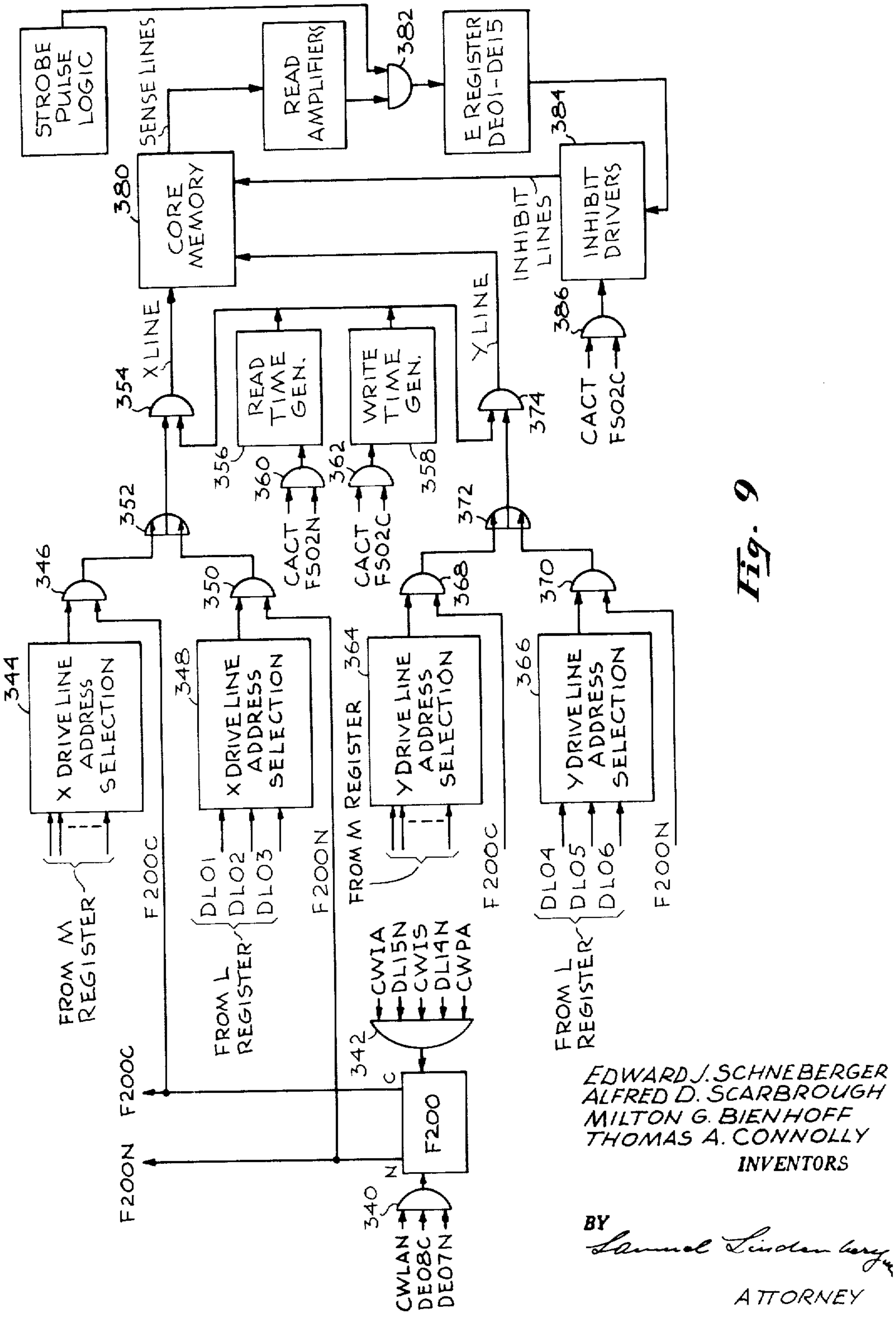
FIG. 9 is a block diagram showing memory read and write in response to either L or M-register address.

Reference is now made to FIGURE 9, which shows a block diagram of the arrangement employed for addressing the core memory from either the L-register or the M-register. The determination as to which of these address's controls is the function allocated to the output of a flip-flop designated as FZOO. This flip-flop provides a normal output in response to the application of signals CWLAN, DEOAC, and DEO7N, which are applied to an AND gate 340. The output of this AND gate is applied to the FZOO flip-flop. Another AND gate 342 can drive this flip-flop to provide a complement output in response to the simultaneous application to its input of signals CWIA, DL15N, CWIS, DL14N, and CWPA.

The address outputs from the M-register are applied to X-drive-line address-selection logic 344. The selected address-output line connects to an AND gate 346. This AND gate provides an output when it receives a FZOOC signal from the flip-flop FZOO. The L-register address outputs are also applied to X-drive-line address-selection circuits 348. The selected X-line address is applied to an AND gate 350, which has as its other required input an output from the FZOON side of the flip-flop FZOO. The outputs of AND gate 346 and 350 are applied to an OR gate 352. The OR gate output is applied to a driving AND gate 354. This AND gate is enabled to drive the core memory selected X-line for reading from a reading-timing generator 356 or for writing from a writing-timing generator 358. The reading-timing generator is driven by the output of an AND gate 360, which response to signals CACT and FSO2N. The writing-timing generator responds to the output of an AND gate 362, which provides an output when the timing signals CACT and FSO2C are applied to its input.

Two Y-drive-line address-selection circuits, effectively 364 and 366, are provided. The Y-drive-line address-selection circuits are addressed from the M-register and the selected address is applied to an output AND gate 368. This AND gate is enabled in the presence of the FZOOC signal. The Y-drive-line address-selection circuits 366 are addressed from the L-register. The output is applied to an AND gate 370. This AND gate is enabled in the presence of the FZOON signal from the flip-flop. The output of AND gates 368 and 370 are applied to an OR gate 372. The OR gate output is applied to an AND gate 374. This AND gate is driven in response to the output of the OR gate 372, and signals from either the read-timing generator 356 or the write-timing generator 358. The AND gate 374 output drives the selected Y-lines to the core memory 380.

It was described previously herein that the coincidence of the X- and Y-drives cause a core in each core plane to be driven. A sense line threaded through each core plane detects whether the output of the driven core is a P or an N signal. The sense lines are connected to read amplifier 380. The output of each one of the read amplifiers is applied to an AND gate 382. Strobing-pulse logic 389 enables these AND gates 382 to transmit the signal applied to their inputs at a time which is determined by the logic shown in FIGURE 12. This interval is selected in order to minimize the effect of any stray signals which can give a false reading signal. The output of the gates 382 is applied to the E-register to drive the delay flip-flops DEO1 through DE15 therein to states representing the information read out of the core memory.

The E-register output is applied to 15 inhibit drivers 384. These inhibit drivers are enabled to drive inhibit lines in the presence of an output from an AND gate 386. This AND gate is enabled by logic signals CACT and FSO2C being applied to its inputs. Each one of the inhibit lines is threaded through an entire core plane of the memory 380. The address of the data which has been read into the E-register is again applied to the respective X- and Y-drive-line selection circuits, which drive the selected X and Y lines in a direction so that the core at each core plane coupled to the driven X and Y lines will be driven to one of its states of remanence. This will occur except in those core planes in which an inhibit line is excited. This excited inhibit line will prevent the core from being driven by the X and Y drive lines.

Accordingly, in the foregoing description, it has been shown that the M- or L-register can address the memory, as determined by the output of the FZOO flip-flop. As soon as data has been read out of the core memory into the E-register, it is read back into the core memory to restore the logand, which, in the process of reading, has been destroyed.

Figure 12A:
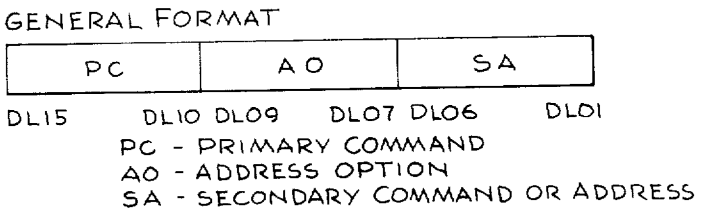
FIGS. 12A, 12B and 12C are diagrams exemplifying logand formats.
Figure 12B:
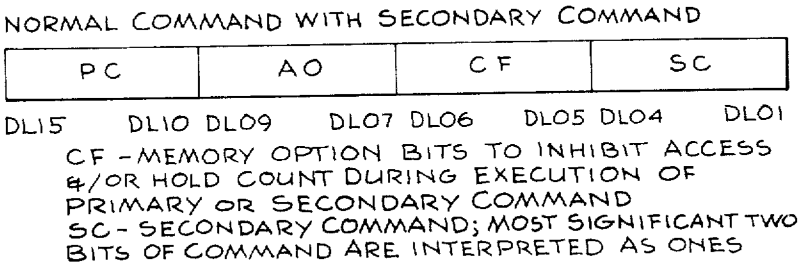
Figure 12C:
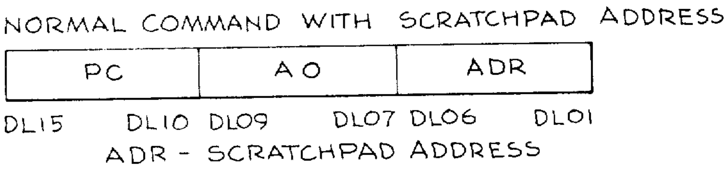
Figure 12:
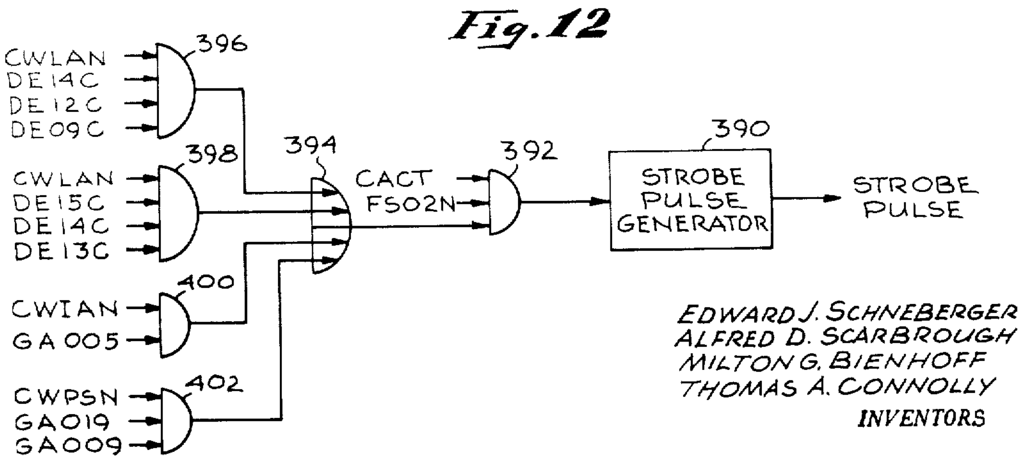
FIG. 12 is a block diagram illustrating the logic for generating a strobing pulse required for operating the memory of the stored logic computer.

FIGURE 12 is a block diagram of the strobing-pulse logic 389. A strobing-pulse generator 390 is enabled to produce a strobe-pulse output upon receiving an energizing signal from an AND gate 392. The AND gate receives the output of an OR gate 394 at its input, as well as signals CACT and FSO2N. The OR gate 394 is enabled by the output of any one of AND gates 396, 398, 400, and 402. AND gate 396 can provide an output in the simultaneous presence of signals CWLAN, DE14C, DE12C, and DEO9C. AND gate 398 can produce an output in the simultaneous presence of signals CWLAN, DE15C, DE14C, and DE13C. AND gate 400 can produce an output in the simultaneous presence at its input of signals CWIAN and GAOO5. And gate 402 can produce an output upon the simultaneous application to its input of signals CWPSN, GAO19, and GAOO9.

Figure 10:
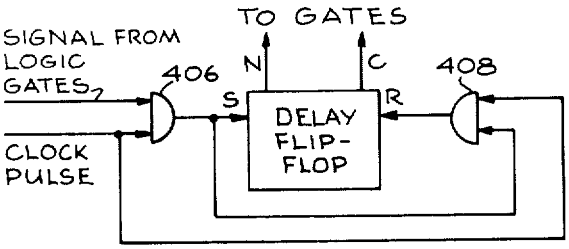
FIG. 10 is a block diagram of a delay flip-flop used to make up a register.

It has been indicated herein that each one of the L, M, P, E, A, T registers contains fifteen delay flip-flops. FIGURE 10 is a block diagram of a typical delay flip-flop and its associated logic. The delay flip-flop 404 can comprise any well known flip-flop circuitry which has two inputs, respectively set and reset, and has two stable states. In response to an input applied to its set terminal, it will transfer, after a short delay, to one of the stable states at which it provides an "N" or normal output. In response to an input applied to its reset terminal, it applies a "C" or a complement output. An AND gate 406 drives the delay flip-flop to provide an "N" output upon receiving a clock pulse from the clock-pulse generator of the computer and also a signal from the output of any one of the computer logic gates which drive this flip-flop.

AND gate 406 output is applied to the set input terminal of the delay flip-flop, and also is applied as an inhibit input to a gate 408. Another input to gate 408 is the output of the clock-pulse generator. The output of the gate 408 is applied to the reset terminal of the delay flip-flop. In the presence of a signal from the computer logic gates and a clock pulse, the output of AND gate 406 drives the delay flip-flop to provide a normal output and inhibits gate 408 from passing the clock pulse. When no signal is received from the logic gates of the computer, but a clock pulse is received, then the clock pulse is applied thru gate 408 to the reset input of the delay flip-flop which is reset so that it provides a "complement" output. Accordingly, in the embodiment of the invention, the registers can change their contents on each clock pulse, unless instructed to the contrary.

Figure 11:
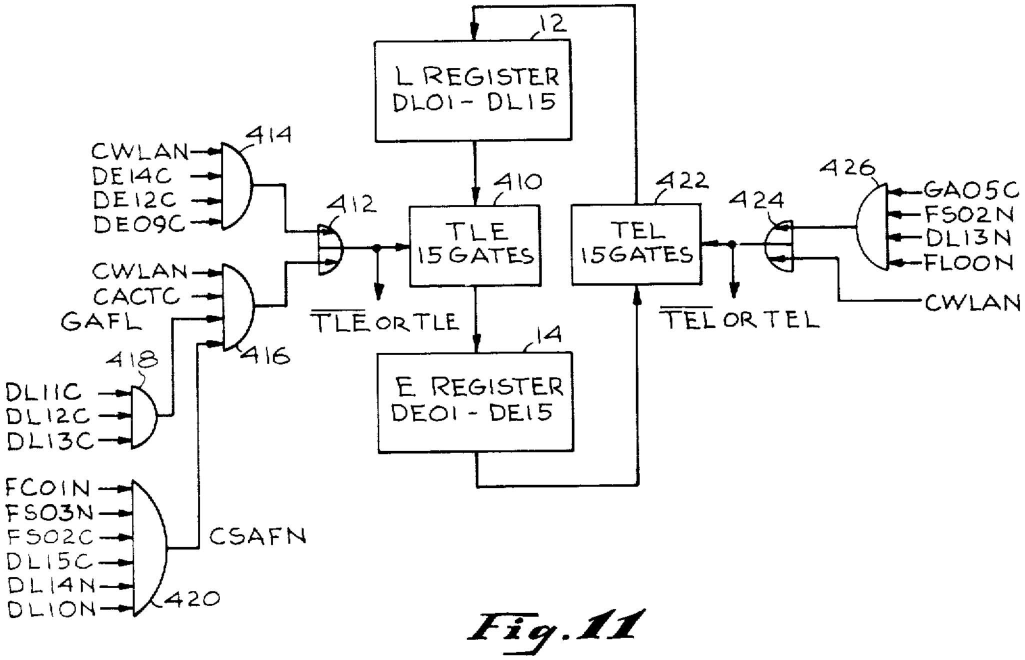
FIG. 11 is a block diagram of a logic controlled transfer from the L to the E-register and from the E to the L-register.

FIGURE 11 is a block diagram illustrating a typical logic controlled transfer of the type which is employed herein for transfers between the various registers. There is shown by way of example a transfer from the E-register to the L-register and from the L-register to the E-register. The "N"-output of each delay flip-flop in the L-register is applied to a different one of 15 gates. These are represented by the TLE rectangule 410 (transfer from L to E-register). Each one of these 15 gates applies its output to a different one of the gates 406 (shown in FIG. 10) of the 15 delay flip-flops in the E-register 14. The TLE gates 410, however, are not able to transfer the L-register outputs until an enabling signal is received from an OR gate 412. This OR gate can apply the required output in the presence of an input from any one of AND gates, respectively 414 or 416. The AND gate 414 provides an output in the simultaneous presence of input signals CWLAN (see FIGURE 2B) and the ninth, twelfth, and fourteenth stage complement outputs of the E-register. AND gate 416 can provide an output in the simultaneous presence of input signals CWLAN, CACT, GAFL and CSHFN. The GAFL signal is derived by applying the complement outputs of the eleventh, twelfth, and thirteenth stages of the L-register to an AND gate 418. The output CSHFN is derived from signals FOO1N, FSO3N, FSO2C, DL15C, DL14N and DL10N being applied to an AND gate 420. AND gates 418 and 420 have their outputs applied to AND gate 416.

The transfer of the contents of the L-register to the E-register can be represented by the following logical equation:

$$TLE = CWLAN \cdot DE14C \cdot DE12C \cdot DEO9C + CWLAN \cdot DE15C \cdot DE14C \cdot DE13C + DL11C \cdot DL12C \cdot DL13C \cdot FCO1N \cdot FSO3N \cdot FSO2C \cdot DL15C \cdot DL14N \cdot DL1ON$$

In the equation provided, the symbolism is that commonly employed in logic equations. The "·" joins the "and" terms and the "+" joins the "or" terms.

A transfer of the contents of the E-register into the L-register can take place through the 15 gates, designated as TEL 422 (transfer E to L-register). These gates have their inputs connected to the respective normal outputs of the 15 delay flip-flops in the E-register. These gates are enabled in the presence of an output from an OR gate 424. This OR gate can provide an output, either in the persence of a CWLAN signal or in the presence of an output from an AND gate 426. This AND gate is actuated in the simultaneous presence of signals, respectively GAO5O (see FIGURE 2A), FSO2N, DL13N, and FLOON (see FIGURE 2C). This operation of the TEL gates can be also written as a logical equation as follows:

$$TEL = CWLAN + GAO5O \cdot FSO2N \cdot DL13N \cdot FLOON$$

The output of the OR gate 412 which enables the TLE transfer can be taken as a TLE signal. When no TLE transfer is taking place, then the output of the OR gate is a $\overline{TLE}$ signal (not TLE). Similarly the output of OR gate 412 in the presence of a TEL transfer is a TEL signal, and in the absence of such transfer is a $\overline{TEL}$ signal. The logic for all the register transfers will be given subsequently herein. It will be readily understood from the foregoing example and those skilled in the art will have no difficulty with its mechanization.

It has been pointed out that control of this computer is achieved through elementary instructions or operands called logands (for logical commands), which are stored in the memory. The logands are each 15 binary bits in length and occupy a single location in the memory. The logands are read from the memory, interpreted in the E and L-registers, and executed to carry out the operation specified. The logands may be stored anywhere in the memory and are normally executed as sequential clusters of logands.

The general logand format is indicated in FIGURE 12A of the drawings. A logand is divided into fields. Stages 10 through 15 of the L-register hold the primary-command portion of the logand. Primary commands fall into two general classes. One class, designated as regular primary commands, is repersented by octalcodes 40 through 77. The second class designated as special primary commands is represented by octalcodes 00 through 37. Each different primary command determines the interpretation to be given to the remainder of the logand. Logands containing regular primary commands are designed as regular logands, and those containing special primary commands are designated as special logands.

The address option field usually occupies the seventh through the ninth stages of the L-register. The secondary command or address usually occupies the first through the sixth stages of the L-register. Logands which contain regular primary commands have one or the other of the formats shown in FIGURES 12B and 12C. The format shown in FIGURE 12B is used for address options designated by DM, DP, DA, IM, IP, and IA. The logand format used in FIGURE 3C is employed for address options designated by DP and IL.

The address option (AO) is a three-bit code which determines the source of the address to be used in addressing operands in the memory. This is used in controlling flip-flop FZOO. Such an address is referred to as the target address. The address option DL, which is specified by the octalcode 1 in the AO-field portion of the logand, specifies that the target address is taken from the low-order six bits of the logand (in the L-register) being executed. This option provides a means for addressing locations 0 through 63 of the memory. These 64 locations are referred to as scratch pad, since they are useful for storing intermediate results of data-processing by the computer.

The IL address option specifies that the target address is to be obtained from the scratch-pad location called for in bits 1 through 6 of the logand. This is an indirect address option.

The DM address option, represented by the octalcode zero, specifies that the target address should be taken from the M-register. At the time that the memory is accessed, the M-register contains an address which is one greater than that of the logand currently being executed. Thus, since the current logand is in location M, the target address will be $M+1$.

The IM address option is represented by the octalcode four. This specifies that the target address is the contents of the memory location immediately following the logand. Thus, if the current logand is in location M, the target address will be $M+1$.

The DP address option, represented by octalcode two, and the IP address option, represented by the octalcode six, respectively designate that the target address is taken from the P-register or that the target address is taken from the memory location whose address is held in the P-register. Similarly, the DA and IA address options, respectively represented by the octalcodes three and seven, specify that the target address should be taken from the A-register or that the target address should be taken from the address located in the A-register.

In FIGURE 12B, CF specifies the control field. This portion of the logand constitutes a two-bit code which controls the accessing of the memory and the incrementing of the target address with a regular logand. If $CF=0$, the memory will be accessed, either to read an operand from memory or to write an operand in memory, and the target address will be incremented. If $CF=1$, memory accessing takes place, but incrementing of the target address is inhibited. If $CF=2$, no memory accessing takes place, and the target address is incremented. If $CF=3$, both accessing and incrementing are inhibited.

Referring back to FIGURE 1, it was indicated in the description thereof that the half-adder would increment the address in the M-register when the DMOO flip-flop provided a normal output (or DMOON). Otherwise the M-register address was not incremented. The half-adder always adds the address in the M-register of the output of the DMOO flip-flop. The logic signals which control the DMOO flip-flop are shown subsequently herein. The DMOO flip-flop is maintained in its complement state unless ordered to its normal state. The output of the half-adder is transferred out as instructed from the logand to be replaced by a new sum of the address in the M-register and the output of the DMOO flip-flop.

It should be noted that the full-adder, like the half-adder, always has available the sum of its inputs. The full-adder inputs are the contents of the A and E-register. This sum, upon instruction, can be gated into the A-register.

The states assumed by the state counter, which are shown in FIGURE 2D, are significant in the operation of the memory also. The states of the counter and the functions allowed in response thereto are as follows:

RL state (read logand)—the logand in the memory—is read into the E-register. WL state (write logand)—the logand in E-register—is rewritten into the memory (to restore the original contents). RI state (read indirect address)—when specified by a logand, an indirect address is read from a memory address located in L, M, P, or A registers. WI state (write indirect address)—the indirect address read from the memory during RI—is restored into the memory. RP (execute primary command)—the primary command (in the most significant part of the logand) is executed; i.e., multiply the number in the E-register by the number in the P-register. HC state (hold control)—the machine is held for an input or output, i.e., send the results of the multiplication to the tape punch. WP state (write operand)—execute secondary command (the operand for the arithmetic or other operation is restored into the memory or, if called for by the logand, the secondary command is executed).

There are four sequential paths which the state counter may take. For any logand, except a data processing logand, the sequence is from WP to RL to start the cycle; then to WL, where an alternate path exists. This alternate path depends upon the address option in a logand. For a direct-address option, the sequence is from WL to RP; for indirect-address option, the sequence is from WL to RI.

After an indirect address is obtained from the memory, the original memory contents (for that address) are restored during the WI state. Whenever a word is read from the memory, that word must immediately be rewritten, since the memory cores are always altered upon readout sensing.

The RP (execute primary command) can then be entered, either from the WL state or the WI state, depending on whether the address option is direct or indirect. The alternate exit from the RP state is for an input or an output (to the HC state—hold control) or to WP state, to write the operand (obtained from the memory) back into the memory, or to execute a secondary command, if called for by the logand.

For a data-processing logand, the sequence is from WP to RI to WI; then to RP and WP, as described above.

It has been indicated that there are two types of primary command, the load type (octalcodes 44–47, and 54–77) and the store type (octalcodes 40–43, and 50–53). In both types of primary commands the target address to be used in accessing the memory and the incrementing of the target address are determined by the address option and the control field respectively. Some examples of regular primary commands are shown below.

OCTALCODE

| | |
|---|---|
| 75 | Load A. |
| 62 | Load P. |
| 70 | Load T. |
| 72 | Load M. |
| 55 | Replace A. |
| 47 | Replace P. |
| 45 | Replace T. |
| 66 | Replace M. |
| 64 | Exchange A and P, exchange A and T. |

The register-loading operations specify a transfer of the content of the E-register to the respective A or P or T or M registers. The specified replace operations call for the contents of the E-register to be entered into the contents of the specified register and the contents of the specified register to be entered into the E-register. The exchange operations specified should be clear. It should be noted that these commands are by way of example, and are not exclusive. These are known as load-type commands. An example of store-type commands is shown in the following table:

| | |
|---|---|
| 52 | Store E. |
| 50 | Store A. |
| 42 | Store P. |
| 40 | Store T. |
| 51 | Hold A. |
| 43 | Hold P. |
| 41 | Hold T. |
| 53 | Hold M. |

The store-type commands call for the transfer of the contents of the register specified into the E-register. The contents of the register from which the transfer is made (except in the case of the E-register) are lost. The hold-type commands specified call for the contents of the specified register to be transferred to the E-register, and the contents of the E-register to be transferred to the specified register.

If the DL or IL address option is used in a regular logand, the secondary field of the logand (bit position 1 through 6) will be interpreted as a scratch-pad address. If any other address option is used (DM, DP, DA, IM, IP, or IA), bit positions 1 through 4 of the logand are generally used for a secondary command. Like the primary command, the secondary command selects one or more explicit basic operations. These operations are generally initiated on a clock pulse following the explicit operation selected by the primary command—that is, on clock pulse 4 of the direct-address option cycle or on clock pulse 6 of the indirect-address option cycle. The following table exemplifies secondary commands.

OCTALCODE

| | |
|---|---|
| 00 | No operation. |
| 15 | Load A. |
| 02 | Load P. |
| 10 | Load T. |
| 12 | Load M. |
| 06 | Exchange A and P. |
| 04 | Exchange A and T. |

When a load primary command is specified together with a DL (scratch pad) address option, the sequence which occurs, as a result of clock pulses, logic decoding and state counter advance, is as follows (assuming a logand has been just previously entered into the E-register):

Clock 1: Rewrite the contents of E-register (logand) back into memory to restore the original logand in the memory, under M-register control.

Clock 2:

A. Increment contents of M-register by one via the half-adder and re-enter the incremented contents back into M. Transfer the E-register contents to the L-register.

B. Address the memory from the L-register.

C. Enter the addressed memory location into E.

Clock 3: Rewrite the E-register contents into the location in the memory just addressed.

Clock 4: Transfer the contents of E-register to L-register. Read into the E-register the contents of the memory location, the address of which is now in the M-register.

The operation which is described is a basic sequence in reading out a word from the scratch-pad portion of the memory. The primary-load command is executed in the above sequence during clock time 3.

A DL address option for a load command calls for the following sequence:

Clock 1: The logand previously read in the E-register is rewritten into the memory address held in the M-register.

Clock 2: Increment the contents of the M-register by one, using the half-adder. Transfer the logand in the E-register to the L-register. Also transfer the L-register contents to the E-register (to save the L-register contents). The memory address which is held in the L-register is then used to clear this memory address.

Clock 3: Write into the memory at the address specified in the L-register the word that has been entered into the E-register as a result of the execution of the primary command.

Clock 4: Transfer the contents of the E to the L-register (to save the stored word). Read the next logand into the E-register from the address specified in the M-register.

When an indirect address option is specified, six clock pulses are required to execute the indicated functions. Here an address of an address contains a desired operand; that is, the original memory address contains the address of the desired word, rather than the word itself. The sequence for an IL—load operation—is as follows:

Clock 1: E is rewritten into memory under control of M.

Clock 2:

A. M is incremented to address the next logand
B. The contents of E (logand) are transferred to L.
C. L addresses the memory (scratch pad), and the contents of this location are read into E.

Clock 3: The number read into E is rewritten into memory (scratch-pad address) to restore the original contents.

Clock 4: Transfer the contents of E to M (address in scratch pad), and transfer the contents of M (next logand) to P (for storage). The transfer from M to P is through the half-adder, but no addition is performed. Read into E the number in the address specified by M.

Clock 5: Rewrite from E into memory to restore the number just read out (the number in E is the desired number for loading).

Clock 6: Transfer the next logand (in P) to M. Increment what was in M and transfer it to P. Transfer E to L (to save E's contents and read into E the next logand addressed by M).

The primary command to load would be performed during the clock 5 interval, and the transfer would be from E to one of the other registers, i.e., E to A.

The store operation for an IL address option requires the following sequence:

Clock 1: E is rewritten into memory under control of M.

Clock 2: M is incremented and returned to M. The logand in E is transferred to L, and L addresses the memory with a read P into E.

Clock 3: E contents are rewritten into the memory at the address specified by L.

Clock 4: The contents of E are transferred to M. The contents of M are sent via the half-adder, unincremented, to P. The contents of P are transferred to E (for possible transfer to other registers, if desired). The memory location specified by the contents of M is then cleared.

Clock 5: E is then written into the memory (this is in accordance with the store primary command).

Clock 6: The next logand (in P) is transferred to M. The contents of M (the desired indirect address) is incremented and transferred to P. The contents of E are sent to L, and the next logand is read into E under control of M.

The foregoing operations are representative of the operation of the system and exemplify basic logand cycles. The structure required for effectuating the transfers has been shown in the drawings. The logic signals which are required in order to effectuate the transfers between registers, as well as the circulation of the contents of the register, are shown in the following equations. The terminology to be employed is as has been heretofore described. The letter T represents a transfer. The two letters that follow indicate the transfers. Thus, TAE indicates a transfer of the contents of A-register into the E-register. The logic equation shows to those skilled in the art the structure required for the TAE transfer. The terminology employed in the remainder of the equation is in accordance with that previously shown herein. The terminology, other than that specifying the outputs of the registers and flip-flops, represents the result of collections of signals via gates. The signals collected are shown in the tables following that indicative of the register transfer. Thus, GAO35 represents a signal derived from the simultaneous presence of DL13N and DL11C. Since GAO35 is employed for a number of different purposes, obviously it is advantageous to form the logical combination once for use, wherever required. A further illustration is the signal CRWN. This is derived from the logical combination of signals FCO1N and FSO3N, and FSO1N, and DL15N.

*Logical equations*

*TAA* =*GAO35·GAO10*+No data transfer from any other source
*TAC* =Complement A register contents
=*CRWN·DL13C·GAO11* + *CRWN·DL11N·GAO11*
+*CRIA·DL11N·GAOO4*
*TAE* =*CWIA·GAOO5·DLO8N* + *CRPN·DL14C·GAO35*
+*CWPS·GAO19·GAOO9*
*TAF* =*CSHF·DL12C·DLO5N·NSTS* + *CSHF·DLO5N·NSTS·A15C*
*TAM* =*CWLA·DEO8N·DEO7N*
+*CWPS·DL14N·DL13N*+*FLOOC*
+*CWPS·DL12N·DL11N·FLOON*
+*CWPS·GAOO4·DL10N*
*TAP* =*CWLA·DE15C·DE14N·DE13N*
+*CRIA·DL11N·FLOON* + *CRWN·GAO37·GAO10*
+*CWPA·DLO9N·DLO8N·NSCY*
*TAR* =*CSHF·DL12C·DLO5C·FSO1C*
+*CSHF·DL13·DL12·DPO1C·FSO1C*
*TAT* =*CRIA·DL15C·DL10C·GAOO6·DLO5C*
+*CRHS·DL1ON·GAO06*
+*CRWN·GAO38·GAO10*
*TEA* =*CRIA·GAO19·GAOO9* + *CRPN·GAO35·GAO33*
+*CRWN·DL14N·DL12N·GAO35*
+*CWPS·DL11C·GAOO4*
*TEE* =*CRWN·GAO35·GAO13N* + *CWIS·DL12N·GAO38*
+No entry from any other source
*TEL* =*CWPA·NDPI*+*CWLAN*
*TEM* =*CRIA·GAO1O·GAOO9*
+*CRIA·DL13N·DL1ON·FLOON*
+*CRIA·GAO18·DL13*+*CWIAN·NSCY*
+*CRPN·GAO36·GAO33*
+*CRWN·GAO36·GAO19*
+*CRHS·GAO18·DL13C*
+*CWPS·GAO19·DL13C·FLOOC*
*TEP* =*CRPN·GAO37·GAO33*+*CRWN·GAO37·GAO19*
+*CWPS·DL11N·FLOON*
*TET* =*CRPN·GAO38·GAO33*
+*CRWN·GAO35·GAO19*
*TLE* =*CWLAN·DE14C·DE12C·DE09C*
+*CWLAN·DE15C·DE14C·DE13C*
+*CSHF·GAFL*
*TLL* +*TEL·FCO1C·DPOW*
*TPA* +*CWLA·DEO8N·DEO7N*
+*CRWN·GAO37·GAO1O*

TPE =CRIA·GAOO9+CWIAN·DLO8C·GAOO5
+CRPN·GAO37·GAO33
+CWPS·GAOO4·DL1ON
+CWPS·DL12N·GAOO9

TPM =CWLA·DEO8N·DEO7N
+CWIS·DL13C·DL1OC·DLO8N
+CWIS·DL14N·DL13N
+CWPA·DLO9N·DLO8C·NSCY
+CWPA·DLO8N·NSLY
+CWPS·DLO9C·DLO8N·FLOON
+CWPS·DL13N·DL11C·FLOON
+CWPS·GAOO9·GAO19

TPP =No entry from any other source
=$\overline{TEP}\cdot\overline{CMP}\cdot\overline{TAP}\cdot\overline{TPF}\cdot\overline{TPR}$

TSE =CIOC·DLO5N·DLO2N

TPR =CSHF·DLO6N·DLO5C·FSO1C

TTA =CRIA·DL15C·GAOO6·DL1OC·DLO5C
+CRHS·GAOO6·DL1OC
+CRWN·GAO38·GAO1O

TTE =CRPN·GAO38·GAOO5
+CRPN·GAO38·GAO33
+CWBI·FSO1N

TTT =No transfers from other registers
=$\overline{TET}\cdot\overline{TAT}\cdot\overline{CIAT}\cdot\overline{CIBT}$

A15C =DA15N·DE15N

A16C =DA15C·DE15C+DA15C·A15C+DE15C·A15C

CACT =CWPS·GAO19·DL11N·FLOON
+CWLA·DE15N·DEO6C
+CWLA·DE15N·DEO9N
+CWLA·DE15N·DEO8C·DEO7N
+CWLA·DE11C·DEO9N
+CWLA·DE15C·DE14N·DE13C·DE11N

CIAC =CIOC·DLO6N·DLO1N·GAC51
+CWBI·FNTIN·FNTAN·GAC51

CIAE =CIOC·DLO6N·DLO1N·GAC51
+CWBI·FNTIN·FNTAN·GAC51

CIAT =CWBI·FNTIN·FNTAN·GAC51

CIBE =CIOC·DLO6N·DLO3N·GAC51
+CWBI·FNTIN·FNTAN·GAC51

CIBT =CIOC·DLO6N·DLO3N·GAC51
+CWBI·FNTIN·FNTAC·GAC51

CICE =CIOC·DLO6N·DLO2C·GAC51
+CWBI·FNTIC

CIOC =GAIOL·DL12N·DL11C

CMA =CWLA·DE15C·DE14N·DE13N
+CRIA·DL13N·FLOON·DL10N
+CRIA·GAO10·GAOO9
+CWIA·DLO8N·NSCY
+CWPA·DL15N·GAO19·DLO9N·DLO8N
+CWPS·GAO37·DLO9N·DLO8N
+CWPS·DL14N·DL13N·FLOOL
+CWPS·DL11N·FLOON

CME =CRHS·GAO18·DL13C
+CRIA·GAO18·DL13N
+CRPN·GAO36·GAO33

CMM =No transfers from other registers
=$\overline{TEM}\cdot\overline{TPM}\cdot\overline{TAM}\cdot FCO1C\cdot\overline{DPOW}$ CMP =CWLAN·DE15N·DEO8N
+CWLAN·DE13C·DEO8N
+CWIAN·DLO8C·NSCY
+CWIS·DL14·DL13
+CWIS·DL13C·DL10C·DLO8N
+CWPA·DLO9N·DLO8C·NSCY
+CWPA·DLO9C·DLO8N
+CWPS·DL13N·FLOON·DL11C

COUT =GAIOL·DL12C

CRHS =GAO50·FSO1N·FSO2N

CRIA =GAO51·FSO1C·FSO2C

CRPN =GAO50·FSO1N·FSO2C·DL15N

CRWN =FCO1N·FSO3N·FSO1N·DL15N

CSHF =GAO50·FSO2C·DL15C·GAO33

CWBI =GAIOL·DL12N·DL11N

CWIAN =FSO1C·FSO2N·GAO51

CWIS =GAO51·FSO1C·FSO2N·DL15C

CWLAN =GAO51·FSO1N·FSO2N

CWPA =GAO50·FSO2N

CWPS =GAO50·FSO2N·DL15C

DIDRN =IIDA·GAIRA
+IIDB·GAIRB
+IIDC·FNTIC

DMOO =CRLA·DRCY
+CRIA·FZOOC·DL15N
+CRIA·FZOOC·DL13L
+CACT·CRIA·FZOOC·DL12C
+CRPN·FZOOC·DLO5C
+CRPN·DLO9N·DLO8C·DLO7N
+CACT·CRHS·DL14N·FLOON
+CRHS·FLOOC·DL10C·GAO38
+CACT·CRHS·FZOOC·DL10N
+CSHF·GAO37·DL12N·FSO1C

DODRN =IODA·GAORA
+IODB·GAORB
+IODC·FNTOC

DPOW =Power Failure Detector—Activated when power has failed and then returned

FDINC =CRHS·GAO18·DL13C·DLO3N

FDINN =CWPS·GAO18·DL13N·DLO3N

FIDRC =CWBI·GAC51
+CWBI·FSO1C·GAC57

FIDRN =CWBI·GAC51
+CWBI·GAC57

FIINC =CWPS·GAO18·DL13N·DLO3C

FIINN =CRHS·GAO18·DL13C·DLO3C

FLOOC =COND·DLO5N·DLO4C·DLO3C·GAO21·DAO1N
+COND·GAO25·GAO22·GASUM
+COND·GAO26·GAO20·DE15N
+COND·GAO27·GAO20·DA15N
+COND·GAO26·GAO23·FTLDN
+COND·GAO27·GAO21·DA15C
+COND·GAO27·GAO23·A16C
+COND·GAO14
+CR1A·GAOO9·GASUM
+CRLA

FLOON =CRIA·DLO56·DL15C·GAOO6
+CWLA·DE15C·DE13C·DE11C

FNTAC =CIOC·GACHG·DLO1C

FNTAN =CIOC·GACHG·DLO1N

FNTIN =CIOC·GACHG·DLO3N

FNTON =CIOC·GACHG·DLO2N

FODRC =CWPS·GAO12·DL11N·FNTOC
+COUT·DL11N·GAC51

FODRN =DODRC

FTLDC =DODRC·FODRC·FNTOC
+TTE·FC53N
+FNTON·GAC57
+COUT·DL11C·GAC57

FTLDN =COUT·DL11N·FTLDC
+CWBI·CIAT
+CWBI·CIBT
+COUT·DLO4C·TET
+COUT·FC51N

FZOOK=CWIA·DL15N+CWIS·DL14N·CWPA

FZOON=CWLA·DEO8C·DEO7N

GAOO4=DL13N·FZOON

GAOO5=DL15·DL14C·DL12C

GAOO6=DL13N·DL14N·FLOOC

GAOO9=DL11N·FLOON

GAO10=DL14N·DL12N·DL10C

GAO11=DL14N·DL12N·DL10N

GAO13=DL14C·DL12N·DL10C

GAO14=DLO4C·DLO3C·DLO2C·DLO1C

GAO18=DL15C·DL14C·DL10C

GAO19=DL14N·DL12C·DL10C

GAO20=DLO2C·DLO1C

GAO21=DLO2C·DLO1N

GAO22=DLO2N·DLO1C

GAO23=DLO2N·DLO1N

GAO25=DLO5N·DLO4C·DLO3N $GAO26 = DLO5N \cdot DLO4N \cdot DLO3C$
$GAO27 = DLO5N \cdot DLO4N \cdot DLO3N$
$GAO33 = DL14C \cdot DL10N$
$GAO35 = DL13N \cdot DL11C$
$GAO36 = DL13N \cdot DL11N$
$GAO37 = DL13C \cdot DL11N$
$GAO38 = DL13C \cdot DL11C$
$GAO50 = FCO1N \cdot FSO3N$
$GAO51 = FCO1N \cdot FSO3C$
$GAC51 = FC53C \cdot FC52C \cdot FC51N$
$GAC57 = FC53N \cdot FC52C \cdot FC51C$
$GACHG = DLO4N \cdot FODRN \cdot FIDRN$
$GAFL = DL13C \cdot DL12C \cdot DL11C$
$GAIDR = DIDRN \cdot FIDRN$
$GAIOL = DL15C \cdot DL14N \cdot DL10N \cdot FSO3N \cdot FSO2C \cdot FCO1N$
$GTSB = CACT \cdot FSO2 \cdot NISB$
$NDPI = GAOO4$
$NISB = CWLAN \cdot DE14C \cdot DE12C \cdot DEO9C + CWLAN \cdot DE15C \cdot DE14C \cdot DE13C + CWIAN \cdot GAOO5$
$NPOF = FCO1C \cdot DPOW$
$NSCY = DL15N \cdot DL13C + DL15C \cdot DL10C$
$NSTS = GAO14 \cdot DL12C + GAFL \cdot DA15C \cdot DA14N + GAFL \cdot DA15N \cdot DA14C$ There has accordingly been described hereinabove a novel and useful stored-logic computer wherein the logic for the operation of the computer is stored as a sequence of logands in the memory. Means are provided for deriving the logands by the process of incrementing the address of each logand as it is read out from the memory. Means are further provided within this computer for effectuating transfers between the registers within the computer as required for performing logical operations. The stored logic computer thus, with a minimum of wired-in "hardware" in response to a sequence of commands derived from the memory can accomplish operations heretofore possible only with complex structures.

We claim:

1. A computer comprising storage means for storing a computer operand in each of different storage locations in said storage means, first register means for storing the address of a first storage location from which it is desired to read an operand, second register means for receiving an operand read from said storage means, means for reading from said storage means the operand in the storage location having the address stored in said first register, means for entering said read operand into said second register, means for writing back into the storage location from which it was read the operand in said second register means, a third register, means for transferring the contents of said second register means to said third register, adder means for incrementing the address in said first register, and means responsive to a portion of the operand in said third register for determining whether said adder means is operative to increment the address in said first register.

2. A computer as recited in claim 1 wherein said adder means for incrementing the address in said first register comprises a half-adder, a flip-flop circuit having a first and second stable state, means for applying the address in said first register and the output of said flip-flop circuit when in its second stable state to said half-adder to be added, and means for transferring the contents of said half-adder into said first register in place of the address already there, said means responsive to a portion of the data in said third register for determining whether said adder means is operative to increment the address in said first register includes means responsive to a portion of the data in said first register for driving said flip-flop circuit to a predetermined one of its first and second stable states.

3. A computer comprising storage means for storing a computer operand in each of different storage locations in said storage means, first register means for storing the address of a first storage location from which it is desired to read an operand, second register means for receiving an operand read from said storage means, means for reading from said storage means the operand in the storage location having the address stored in said first register, means for entering said read operand into said second register, means for writing back into the storage location from which it was read the operand in said second register means, a third register, means for transferring the contents of said second register means to said third register, means for performing the operations specified by the operand in said third register, and means for replacing the operand in said third register by a succeeding operand and comprising a half-adder, a flip-flop circuit having a first and second stable state, means for applying the address in said first register and the output of said flip-flop circuit when in its second stable state to said half-adder to be added, and means for transferring the content of said half-adder to said first register to constitute the address of said succeeding operand.

4. A computer comprising storage means for storing data in each of different storage locations in said storage means, first and second register means for respectively storing a first and second address of a first and second storage location in said storage means, said first register means including means for storing address option signals indicative as to whether a readout of data is to occur from an address stored in said first register or an address stored in said second register, a third register, means for reading data from the storage location in said storage means having the address in the one of said first and second registers indicated by said address option signals, means for entering the data which has been read into said third register, and means for writing into the storage location in said storage means the data which has been entered into said third register, said storage location having the address in the one of said first and second registers indicated by said address option signals.

5. In a computer having a storage means wherein successive operands are stored in successive storage locations in said storage means, means for successively calling said operands out of storage comprising address register means for storing the address of a first of said successive operands, means for reading an operand out of a storage location having the address stored in said address register means, exchange register means for receiving an operand which is read out of said storage means, decoding register means, means for transferring an operand in said exchange register means into said decoding register means, means for decoding an operand in said decoding register means, and half-adder means for increasing the address in said address register to that of a succeeding operand in response to an output from said means for decoding an operand.

6. A computer comprising storage means for storing binary data in each of different locations of said storage means, a plurality of register means for holding binary data, a half-adder, a first flip-flop circuit having a first and second stable state, means for applying the contents of a first of said register means and the output of said first flip-flop circuit in its second stable state to said half-adder to provide the sum thereof in said half-adder, a second flip-flop circuit having a first and second stable state, means for reading data from a location in said memory having an address represented by data in said first register means when said second flip-flop circuit is in its first stable state and from a location in said memory having an address represented by data in a second of said plurality of register means when said second flip-flop circuit is in its second stable state, first logic decoding means responsive to data in said second register means to determine the stable state of said first flip-flop circuit, second logic decoding means responsive to data in said second register means to determine the stable state of said second flip-flop circuit and means for transferring the contents of said half-adder into said first register means to constitute the address of the next location in said storage means from which a readout may take place.

7. A computer comprising storage means for storing binary data in each of different locations of said storage means, a plurality of register means for holding binary data, a half-adder, a first flip-flop circuit having a first and second stable state, means for applying the contents of a first of said register means and the output of said first flip-flop circuit in its second stable state to said half-adder to provide the sum thereof in said half-adder, a second flip-flop circuit having a first and second stable state, means for reading data from a location in said memory having an address represented by data in said first register means when said second flip-flop circuit is in its first stable state and from a location in said memory having an address represented by data in a second of said plurality of register means when said second flip-flop circuit is in its second stable state, first logic decoding means responsive to data in said second register means to determine the stable state of said first flip-flop circuit, second logic decoding means responsive to data in said second register means to determine the stable state of said second flip-flop circuit, means to enter data readout of said storage means into a third of said plurality of register means, third logic decoding means responsive to data in said second register means for transferring data between said second and third register means, and fourth logic decoding means responsive to data in said second register for transferring the contents of said half-adder to one of said first and third register means.

8. A computer comprising storage means for storing binary data in each of different locations of said storage means, a plurality of register means for holding binary data, a half-adder, a first flip-flop circuit having a first and second stable state, means for applying the contents of a first of said register means and the output of said first flip-flop circuit in its second stable state to said half-adder to provide the sum thereof in said half-adder, a second flip-flop circuit having a first and second stable state, means for reading data from a location in said memory having an address represented by data in said first register means when said second flip-flop circuit is in its first stable state and from a location in said memory having an address represented by data in a second of said plurality of register means when said second flip-flop circuit is in its second stable state, first logic decoding means responsive to data in a first predetermined location in said second register means to determine the stable state of said first flip-flop circuit, second logic decoding means responsive to data in a second predetermined location in said second register means to determine the stable state of said second flip-flop circuit, means to enter data readout of said storage means into a third of said plurality of register means, third logic decoding means responsive to data in a third predetermined location in said second register means for transferring data between said second and third register means, fourth logic decoding means responsive to data in a fourth predetermined location in said second register for transferring the contents of said half-adder to one of said first and third register means, and fifth logic decoding means responsive to data in a fifth predetermined location in said second register means for entering data from said third register means into said half-adder from whence in response to said fourth logic decoding means said data can be entered into said first register means to constitute the address of the next storage location for readout.

9. A computer comprising storage means for storing binary data in each of different locations of said storage means, a plurality of register means for holding binary data, means for reading binary data out of a location in said storage means having an address represented by the contents of a first of said register means, means for incrementing the contents of said first register means to obtain the address of a succeeding location, means for entering the binary data which is read out into a second of said plurality of register means, means for transferring the contents of said second register means to a third of said plurality of register means, a fourth and fifth of said plurality of register means, logic decoding means coupled to said third register means for decoding the contents thereof, and gate means responsive to the output of said logic decoding means to transfer the contents of one of said second, fourth and fifth register means into said first register means to constitute the address of the next location in said storage means from which read out is to be made in place of the address in said first register means.

10. A computer as recited in claim 9 wherein said means for incrementing the contents of said first register means comprises a half-adder means, and said gate means to transfer the contents of one of said second, fourth and fifth register means into said first register includes a separate gate means coupled between each of said second, fourth and fifth register means and said half-adder through one of which the transfer of contents into said half-adder can occur, and a separate gate means between said half-adder and said first register through which transfer of the contents of the contents of said half-adder and said first register can occur, and logic decoding means coupled to said third register means and each of said separate gate means to open said separate gate means in accordance with the data contained in said third register.

References Cited by the Examiner

UNITED STATES PATENTS

| | | | |
|---|---|---|---|
| 3,014,660 | 12/1961 | Patterson et al. | 235—157 |
| 3,015,411 | 1/1962 | Rent et al. | 235—157 |
| 3,036,773 | 5/1962 | Brown | 235—157 |
| 3,037,700 | 6/1962 | Clapper | 340—172.5 |
| 3,058,658 | 10/1962 | Schmierer et al. | 340—172.5 |

ROBERT C. BAILEY, *Primary Examiner.*

MALCOLM A. MORRISON, *Examiner.*

W. M. BECKER, P. L. BERGER, *Assistant Examiners.*

UNITED STATES PATENT OFFICE

CERTIFICATE OF CORRECTION

Patent No. 3,258,748 June 28, 1966

Edward J. Schneberger et al.

It is hereby certified that error appears in the above numbered patent requiring correction and that the said Letters Patent should read as corrected below.

Column 11, line 6, for "FUTAC" read -- FNTAC --; column 14, line 73, for "rectangule" read -- rectangle --; column 15, line 71, for "repersented" read -- represented --; column 20, line 60, for "DL13" read -- DN13N --; column 22, line 22, for "CRHS" read -- CWPS --; line 23, for "CWPS" read -- CHRS --; line 39, for "CR1A" read -- CRIA --.

Signed and sealed this 14th day of January 1969.

(SEAL)
Attest:

Edward M. Fletcher, Jr.
Attesting Officer

EDWARD J. BRENNER
Commissioner of Patents